(12) United States Patent
Ikushima et al.

(10) Patent No.: US 9,002,198 B2
(45) Date of Patent: Apr. 7, 2015

(54) OPTICAL TRANSMISSION SYSTEM

(75) Inventors: Tsuyoshi Ikushima, Nara (JP); Osamu Shibata, Hyogo (JP); Yoshiyuki Saito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 241 days.

(21) Appl. No.: 13/583,102

(22) PCT Filed: Oct. 28, 2011

(86) PCT No.: PCT/JP2011/006055
§ 371 (c)(1),
(2), (4) Date: Sep. 6, 2012

(87) PCT Pub. No.: WO2012/093431
PCT Pub. Date: Jul. 12, 2012

(65) Prior Publication Data
US 2012/0328304 A1 Dec. 27, 2012

(30) Foreign Application Priority Data

Jan. 7, 2011 (JP) ................................. 2011-001914

(51) Int. Cl.
*H04B 10/00* (2013.01)
*H04B 10/07* (2013.01)
*H04B 10/25* (2013.01)

(52) U.S. Cl.
CPC ............ *H04B 10/07* (2013.01); *H04B 10/2503* (2013.01)

(58) Field of Classification Search
CPC ........................................ H04B 10/07–10/073
USPC ........................................................ 398/9–21
See application file for complete search history.

(56) References Cited

U.S. PATENT DOCUMENTS 4,289,398 A * 9/1981 Robichaud .................... 356/73.1
4,883,954 A * 11/1989 Esser et al. ................ 250/227.12
(Continued)

FOREIGN PATENT DOCUMENTS

JP 5-273475 10/1993
JP 6-28594 2/1994
(Continued)

OTHER PUBLICATIONS

International Search Report issued Dec. 13, 2011 in International (PCT) Application No. PCT/JP2011/006055.
(Continued)

*Primary Examiner* — Agustin Bello
(74) *Attorney, Agent, or Firm* — Wenderoth, Lind & Ponack, L.L.P.

(57) ABSTRACT

An optical transmission system for optically transmitting information between apparatuses via an optical transmission path. The system includes: a sending unit that emits, to the optical transmission path, excitation light for detecting an inter-apparatus connection via the path; a responding unit that receives the excitation light from the path and emits detection light to the path using light energy of the excitation light; a response receiving unit that receives the detection light from the path and outputs a detection light current; a detecting unit that detects presence/absence of the inter-apparatus connection based on the detection light current; a light signal transmitting unit that emits, to the path, a light signal for optically transmitting the information based on the detection result by the detecting unit; and a light signal receiving unit that receives the light signal from the path.

12 Claims, 26 Drawing Sheets

(56) References Cited

U.S. PATENT DOCUMENTS

| | | | |
|---|---|---|---|
| 5,177,354 A * | 1/1993 | Tomita et al. | 250/227.15 |
| 5,251,001 A * | 10/1993 | Dave et al. | 356/73.1 |
| 5,416,623 A * | 5/1995 | Dawson et al. | 398/33 |
| 5,778,117 A * | 7/1998 | Inoue et al. | 385/24 |
| 5,883,988 A * | 3/1999 | Yamamoto et al. | 385/14 |
| 7,079,733 B2 * | 7/2006 | Toriumi et al. | 385/101 |
| 7,359,634 B1 * | 4/2008 | Meli | 398/28 |
| 7,369,763 B2 * | 5/2008 | Parsons | 398/16 |
| 7,433,595 B2 * | 10/2008 | Sakai et al. | 398/10 |
| 7,756,181 B2 * | 7/2010 | Kawanishi et al. | 372/50.121 |
| 8,532,497 B2 * | 9/2013 | Chan et al. | 398/171 |
| 8,570,501 B2 * | 10/2013 | Nagel et al. | 356/73.1 |
| 2003/0007215 A1 * | 1/2003 | Snawerdt | 359/152 |
| 2003/0081280 A1 * | 5/2003 | Parsons | 359/110 |
| 2005/0053340 A1 * | 3/2005 | Toriumi et al. | 385/101 |
| 2006/0008276 A1 * | 1/2006 | Sakai et al. | 398/141 |
| 2007/0154215 A1 * | 7/2007 | Zuhdi | 398/67 |
| 2012/0328304 A1 * | 12/2012 | Ikushima et al. | 398/140 |
| 2013/0038865 A1 * | 2/2013 | McClean et al. | 356/73.1 |

FOREIGN PATENT DOCUMENTS

| | | |
|---|---|---|
| JP | 7-87025 | 3/1995 |
| JP | 10-163968 | 6/1998 |
| JP | 11-355208 | 12/1999 |
| JP | 2004-350155 | 12/2004 |
| JP | 2006-50530 | 2/2006 |

OTHER PUBLICATIONS

English translation of International Preliminary Report on Patentabiltiy issued Jul. 18, 2013 in International (PCT) Application No. PCT/JP2011/006055.

* cited by examiner

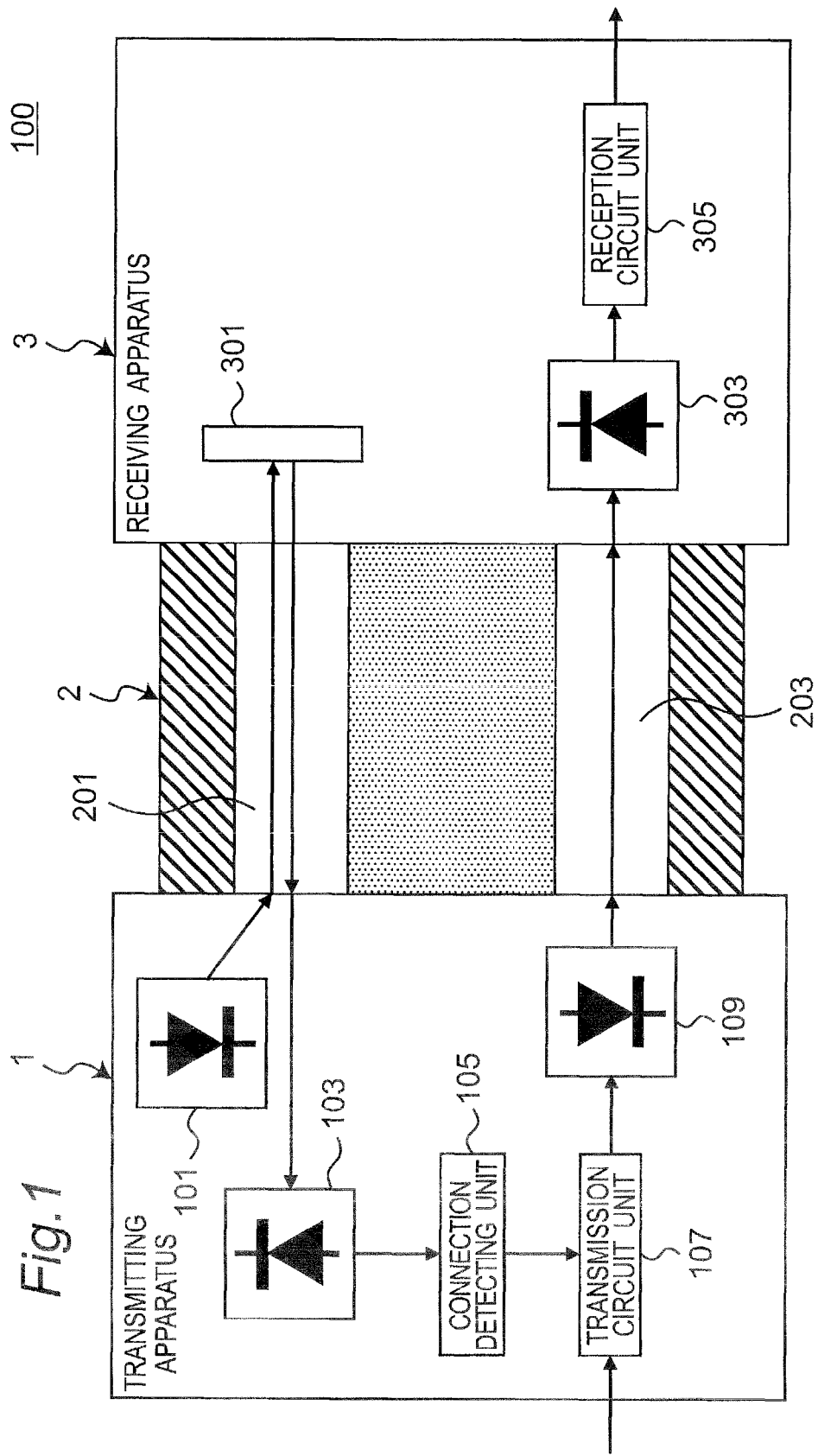

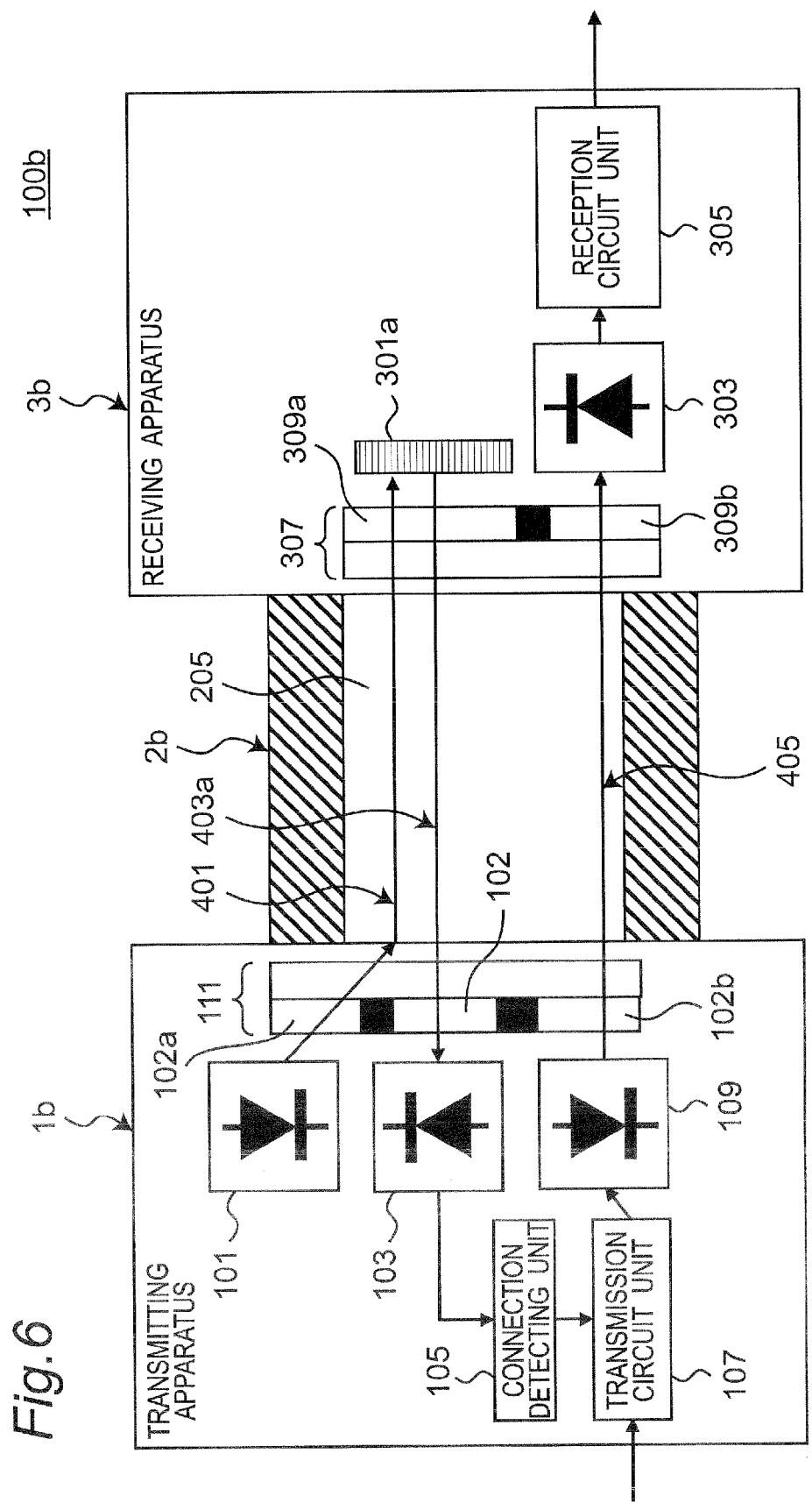

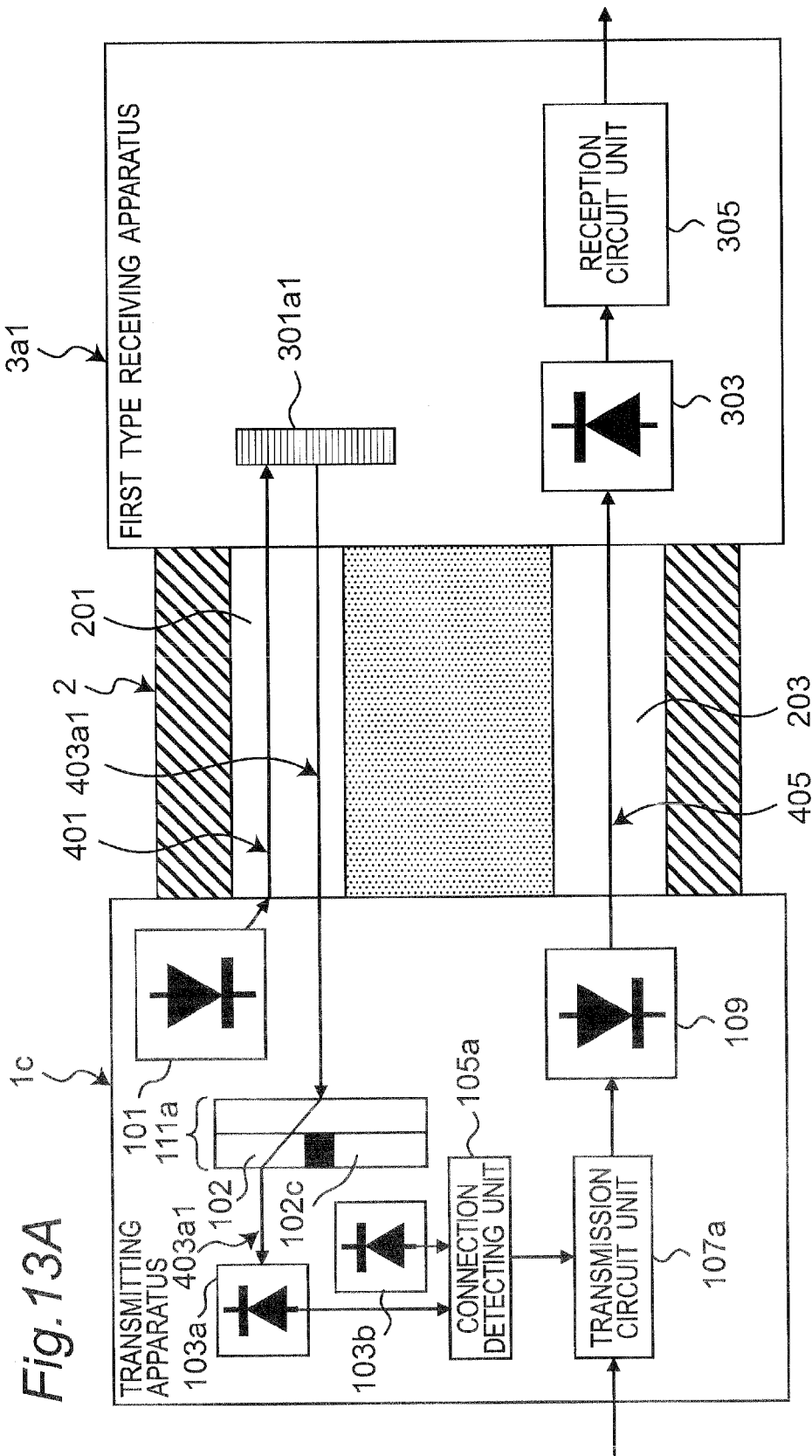

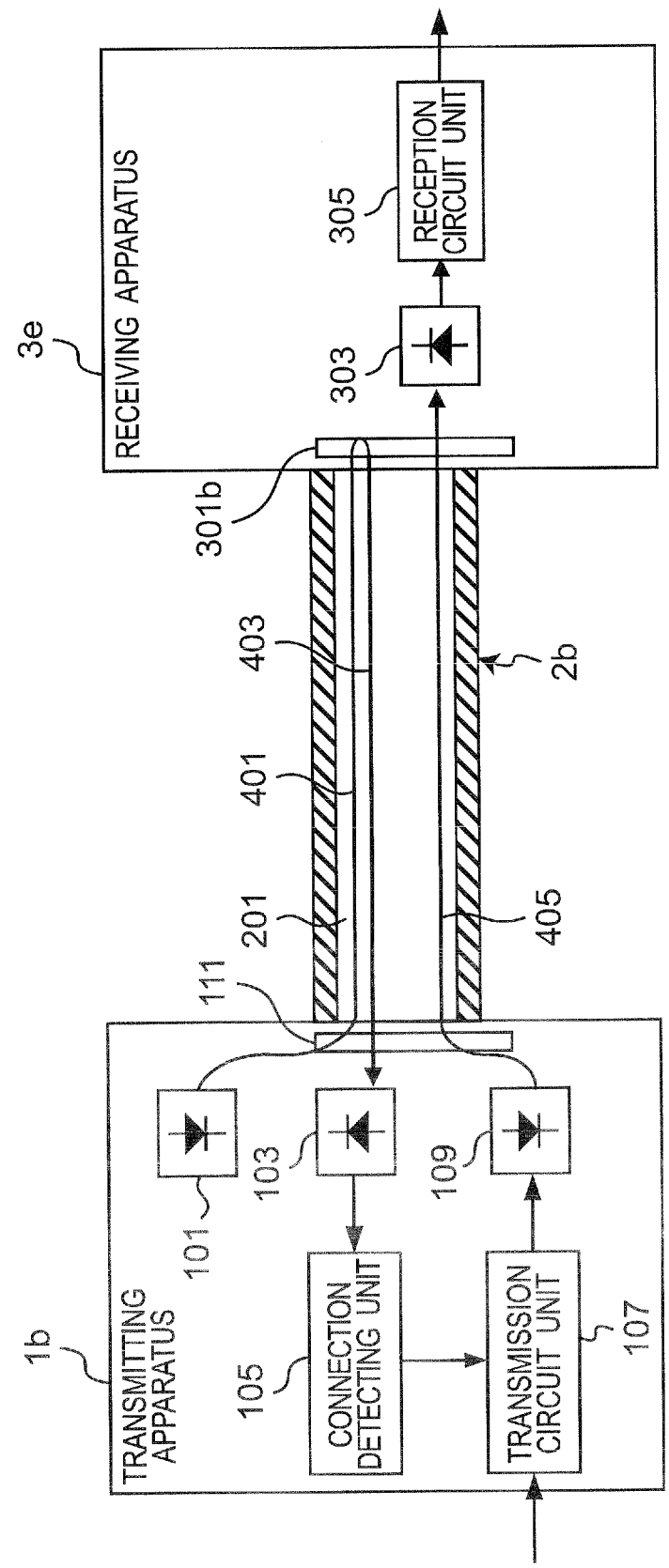

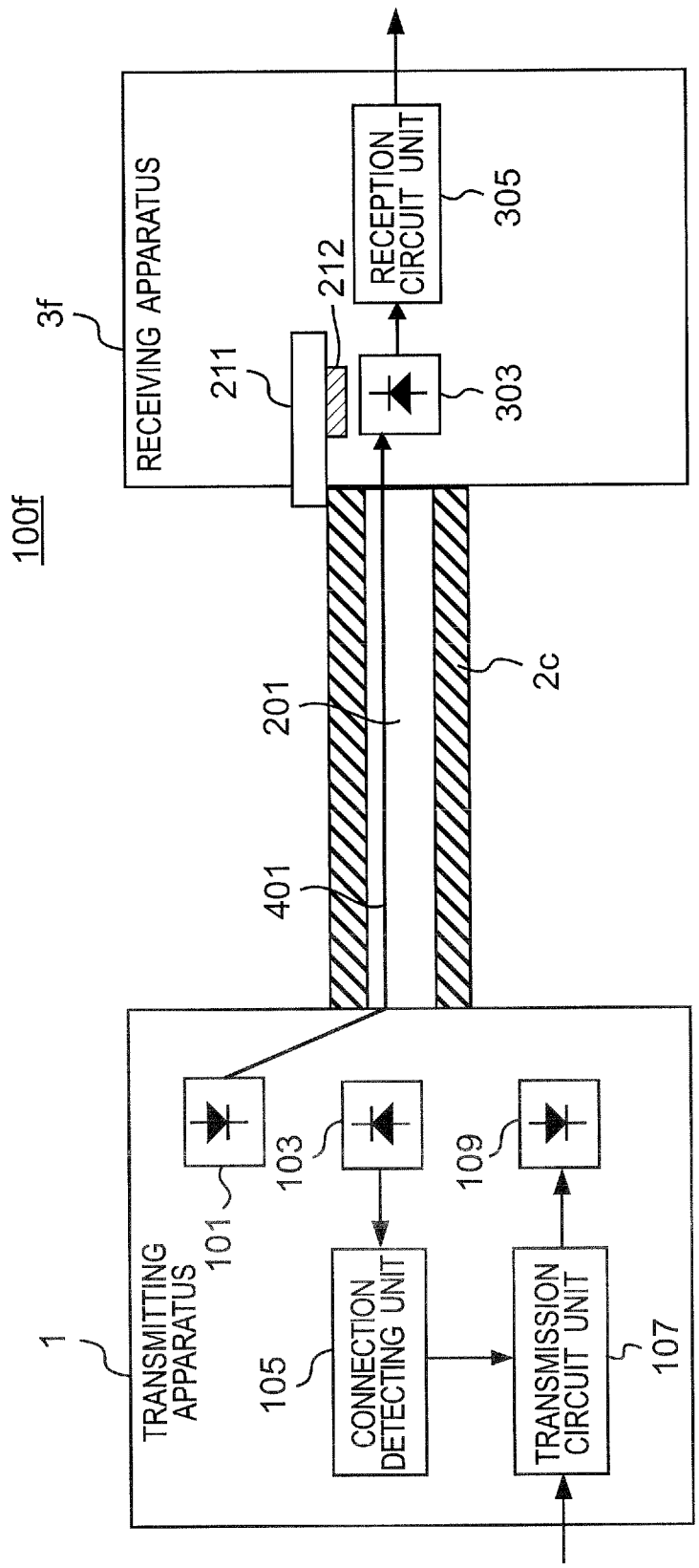

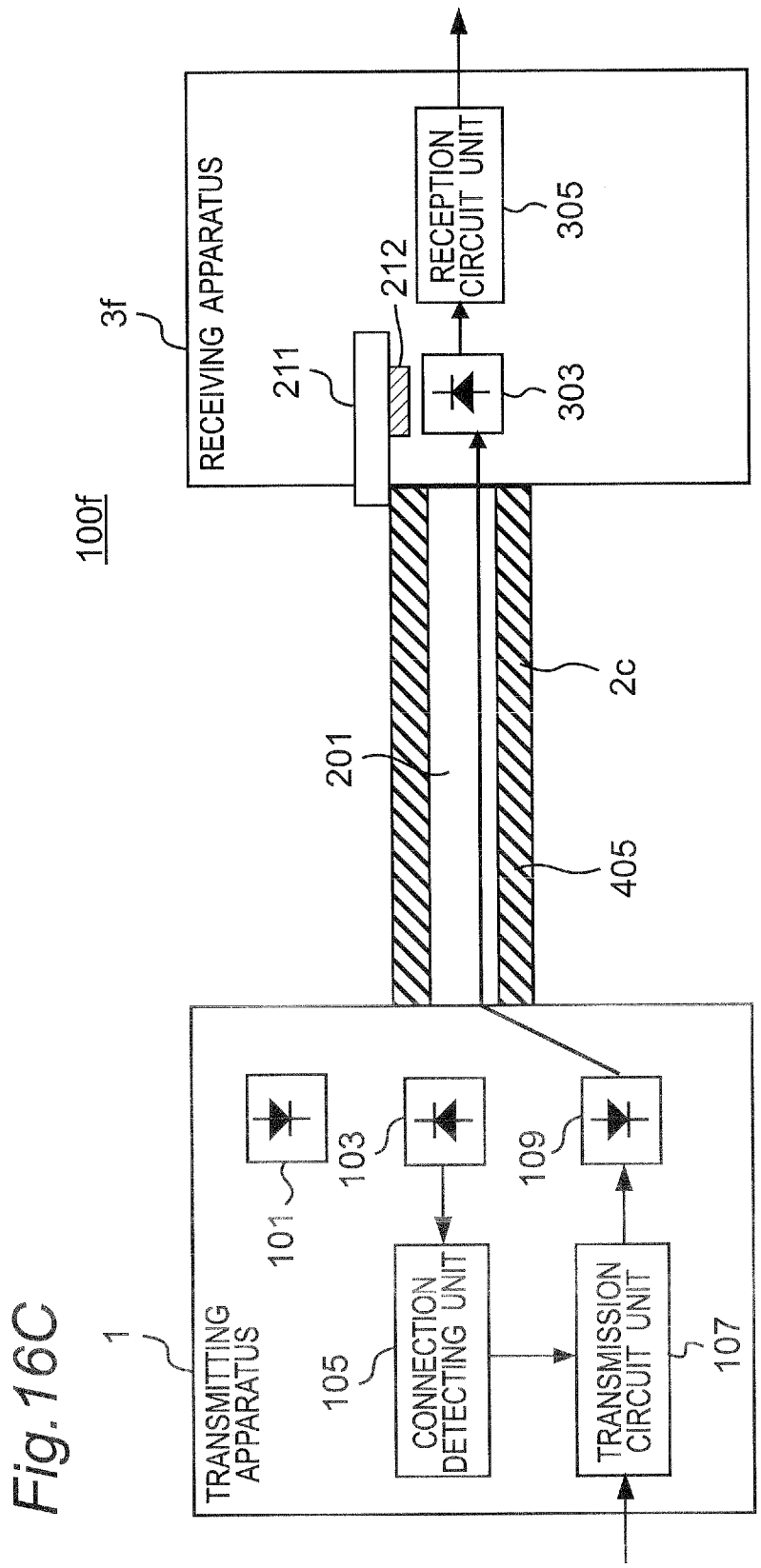

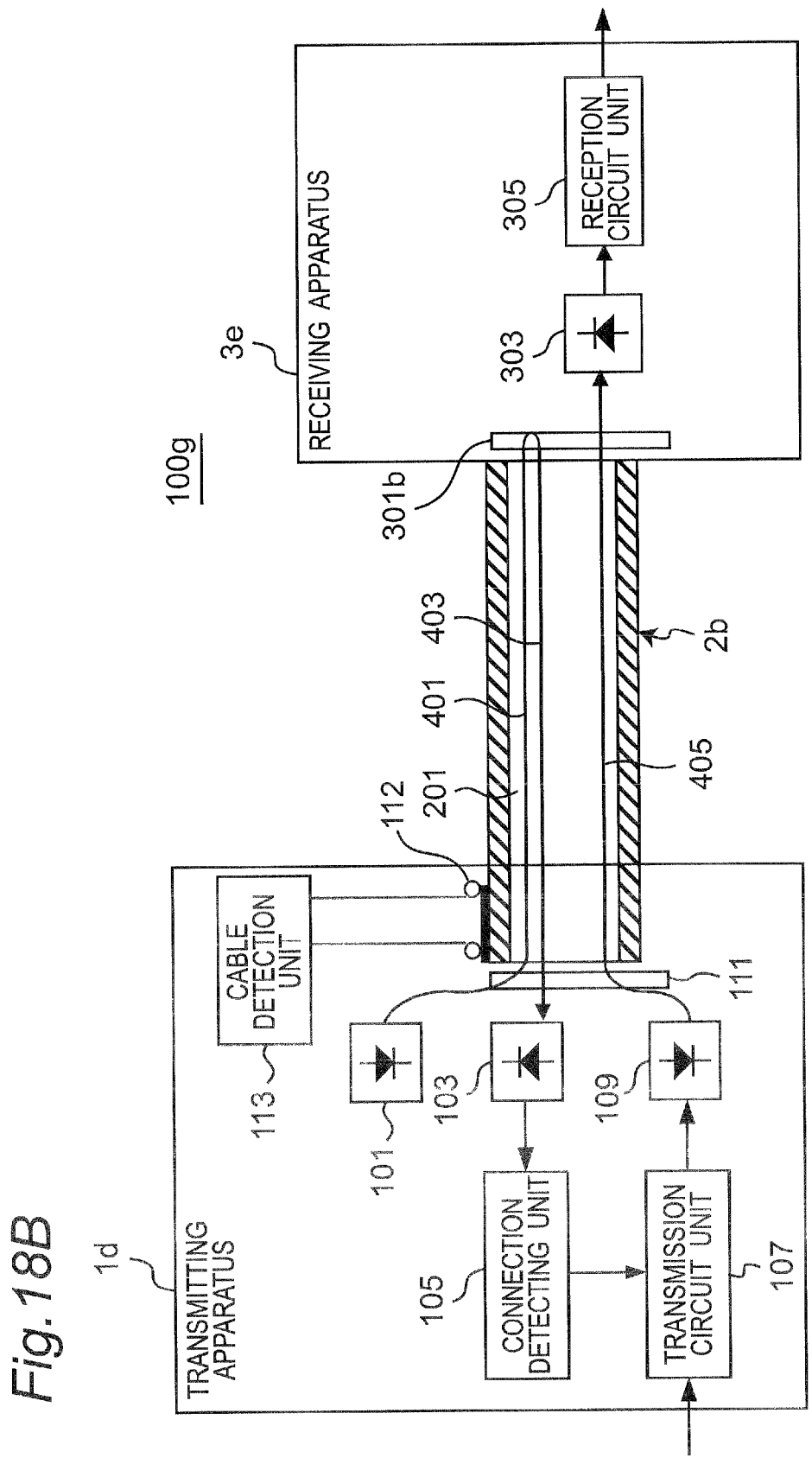

OPTICAL TRANSMISSION SYSTEM

TECHNICAL FIELD

The technical field relates to an optical transmission system, and in particular, to an optical transmission system having a structure for detecting connection via an optical transmission path between an apparatus having a light emitting element (a transmitting apparatus) and an apparatus having a light receiving element (a receiving apparatus).

BACKGROUND ART

Conventionally, the HDMI (High-Definition Multimedia Interface) is known as a standard for inter-apparatus transmission of video signals and audio signals. In a transmission system conforming to the HDMI standard, video signals and audio signals can be transmitted from the transmitting apparatus as a source device to the receiving apparatus as a sink device with no compression.

In recent years, an image resolution of a video image source is becoming higher and a 3D video image is becoming more widespread. Under such circumstances, it is required the non-compression transmission between the apparatuses to speed up its transmission speed.

In order to meet such requirement, it is considered to apply the optical transmission technique that has conventionally been used for a long distance transmission or a high-speed transmission between industrial devices such as a router, a supercomputer and the like to the transmission between consumer devices. In addition, being different from cables for electric power transmission, an optical fiber (an optical cable) used as an optical transmission path never emit electromagnetic noise, and therefore is expected to produce an effect of suppressing the electromagnetic noise.

Meanwhile, in the HDMI standard at present, the function of detecting cable connection between apparatuses preceding the initiation of the inter-apparatus transmission, i.e., what is called a hot plug function (hot plug detect (HPD)) is provided for. In the case where an optical transmission system is applied to a video signal transmission system between consumer devices, it is favorable that a function similar to the hot plug function be also added to such optical transmission system for the purpose of securing the backward compatibility for the HDMI.

Other than the purpose that the backward compatibility for the HDMI should be secured, the hot plug function is useful for the optical transmission system for following reasons.

In optical transmission systems, semiconductor lasers are usually used as light emitting elements. As for an apparatus that uses a semiconductor laser, intensity of laser light emitting outside the apparatus is regulated for the purpose of securing safety of the eyes.

One of the methods for meeting the regulation is to drive a semiconductor laser such that the intensity of the laser light emitted from the light emitting element should be equal to or smaller than the restricted intensity at any time. Naturally, in this case, tolerable light loss at the optical transmission path becomes small.

Accordingly, coupling loss between the light emitting element (semiconductor laser) or the light receiving element (photodetector) and the optical transmission path (optical fiber) have to be maintained low. Consequently, high assembly precision is required for the optical system, which disadvantageously brings about an increase in costs.

Another method for meeting the regulation is to control the semiconductor laser (light emitting element) such that the semiconductor laser stops when the light emitting element and the light receiving element are not connected with each other via the optical transmission path, and that the semiconductor laser drives when they are connected with each other. According to this method, when the light emitting element and the light receiving element are not connected via the optical transmission path with each other, the laser light is not emitted outside. Therefore, the intensity of the laser light output from the semiconductor laser is not restricted by the regulation described above.

However, this method requires a system for detecting that the light emitting element and the light receiving element are connected via the optical transmission path with each other.

For the reasons described above, realization of the optical transmission system provided with the hot plug function has been expected.

Patent Literature 1 (JP2004-350155A) discloses a cable connection detecting method suitable for optical transmission systems. FIGS. 20 and 21 exemplarily show the scheme disclosed in Patent Literature 1. With reference to FIGS. 20 and 21, an optical communication apparatus 910 including a light emitting element (a laser 914) and an optical communication apparatus 920 including a light receiving element (a photodetector 921) are connected via an optical fiber cable 930 with each other. The optical fiber cable 930 includes an optical fiber 932, and further includes conducting wires 931 and 933.

The optical communication apparatus 910 includes an energizing circuit 915, an impedance element 911, and a monitor 912 that monitors the energizing state of the energizing circuit 915. The optical communication apparatus 920 includes an energizing circuit 916 and an impedance element 922.

As shown in FIG. 20, when the optical communication apparatus 910 and the optical communication apparatus 920 are connected via the optical fiber cable 930 with each other, the impedance element 911, the energizing circuit 915, the conducting wire 931, the energizing circuit 916, the impedance element 922, and the conducting wire 932 are brought into conduction state. In this state, the monitor 912 detects impedance which is equal to the impedance when the impedance element 911 and the impedance element 922 are connected in parallel. In this case, the output control unit 913 determines that it is in the normal connected state, and starts light emission of the laser 914 at a prescribed intensity.

On the other hand, as shown in FIG. 21, when the optical communication apparatus 920 and the optical fiber cable 930 are not connected with each other, the conducting wires 931 and 933 and the energizing circuit 916 are not electrically connected with each other. Accordingly, the monitor 912 detects impedance that is equal to the impedance of the impedance element 911 solely. In this case, the output control unit 913 determines that it is in the disconnected state, and stops the light emission of the laser 914.

Thus, the scheme disclosed in Patent Literature 1 provides the conducting wires (i.e., a conductive material) around the optical transmission path, to thereby make it possible to detect whether or not the apparatuses are connected at the both ends of the optical transmission path based on the impedance.

CITATION LIST

Patent Literature

Patent Literature 1: JP2004-350155A

SUMMARY OF INVENTION

Technical Problem

However, in the conventional example, the conducting wires that possibly emit electromagnetic noise are used in order to realize the hot plug function. Accordingly, it is concerned that the effect of suppressing the electromagnetic noise, which is one of the advantages of the optical transmission path, is impaired. Further, it is necessary to supply electric power to the connection detecting system including the conducting wires, the monitor and the like.

In consideration of the foregoing, an optical transmission system equipped with a function of detecting that the transmission-side apparatus and the reception-side apparatus are connected via the optical transmission path with each other with minimum power consumption (i.e., a connection detection function) without impairing the effect of suppressing electromagnetic noise, which is one of the advantages of optical transmission systems, is provided.

Solution to Problem

A first aspect is an optical transmission system for optically transmitting information between apparatuses via an optical transmission path. The optical transmission system includes: a sending unit that emits, to the optical transmission path, excitation light for detecting an inter-apparatus connection via the optical transmission path; a responding unit that receives the excitation light from the optical transmission path and emits detection light to the optical transmission path using light energy of the excitation light; a response receiving unit that receives the detection light from the optical transmission path and outputs a detection light current; a detecting unit that detects presence or absence of the inter-apparatus connection based on the detection light current; an optical transmission light signal transmitting unit that emits, to the optical transmission path, a light signal for optically transmitting the information based on the detection result by the detecting unit; and an optical transmission light signal receiving unit that receives the light signal from the optical transmission path.

Advantageous Effects of Invention

In the optical transmission system, the connection detection function is realized with a very simple structure that can operate with minimum power consumption, and electromagnetic noise is not emitted in association with the operation of the connection detection function.

BRIEF DESCRIPTION OF DRAWINGS

FIG. 1 is a schematic diagram of an optical transmission system according to a first embodiment;

FIG. 6 is a schematic diagram of an optical transmission system according to a third embodiment;

FIG. 13A is an exemplary illustration showing excitation light, detection light, and light signal that propagate through an optical transmission path;

FIG. 14 is a schematic diagram of an optical transmission system according to a sixth embodiment;

FIG. 16B is a schematic diagram showing a situation in which, in the optical transmission system according to the seventh embodiment, the transmitting apparatus and the receiving apparatus are connected with each other via the optical transmission path;

FIG. 16C is a schematic diagram showing a situation, in which the optical transmission system according to the seventh embodiment carries out the signal transmission via the optical transmission path;

FIG. 18B is a schematic diagram showing a situation, in which, in the optical transmission system according to the ninth embodiment, the transmitting apparatus and a receiving apparatus are connected with each other via the optical transmission path;

DESCRIPTION OF EMBODIMENTS

Figure 2A:
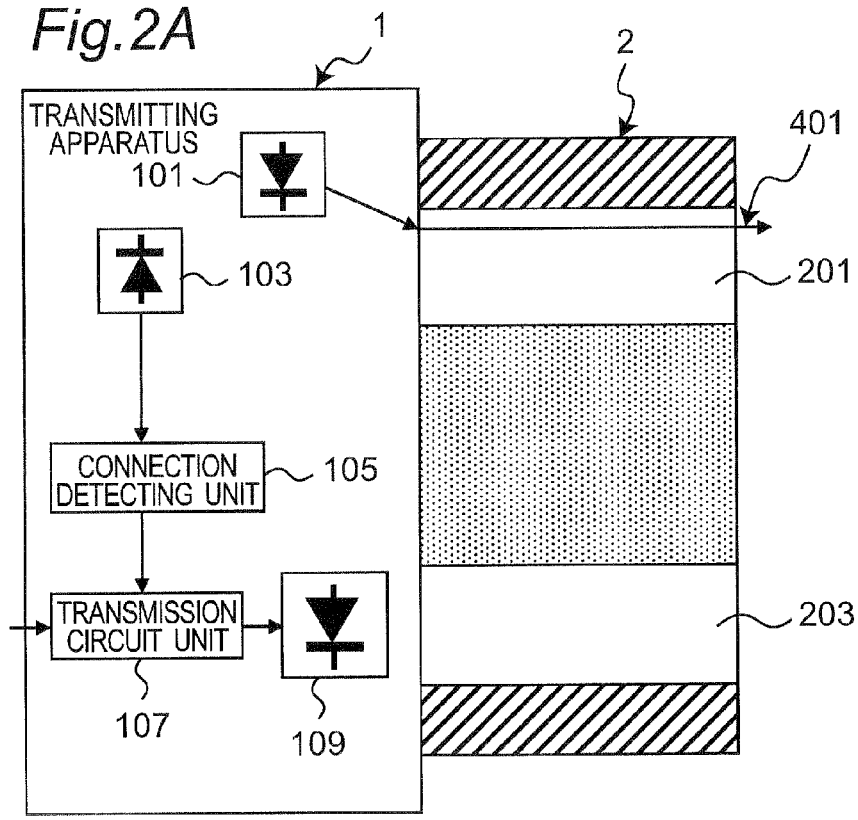
FIG. 2A is an exemplary illustration showing excitation light that propagates through an optical transmission path while connection is being detected.

In the following, detailed description of embodiments will be provided.

1. Overview

Each of optical transmission systems according to embodiments described below is an optical transmission system which can optically transmit intended information (e.g., digital data) from a transmitting apparatus to a receiving apparatus. The optical transmission system has the structure for realizing, in addition to the function of optically transmitting information, a connection detection function for detecting that the transmitting apparatus and the receiving apparatus are connected with each other via an optical transmission path, that is, what is called a hot plug function.

The structure that achieves the connection detection function may include a sending unit, a response receiving unit, a detecting unit, and a responding unit that receives excitation light and emits detection light. The sending unit, the response receiving unit, and the detecting unit may be provided to one of the transmitting apparatus and the receiving apparatus (the transmitting apparatus, for example). The responding unit may be provided to the other one of the transmitting apparatus and the receiving apparatus (the receiving apparatus, for example) or the optical transmission path.

The sending unit emits excitation light to the optical transmission path. The responding unit receives the excitation light that enters from the optical transmission path, and outputs, to the optical transmission path, detection light using the light energy obtained by receiving the excitation light. The response receiving unit receives the detection light emitted from the responding unit and outputs a detection light current. Then, the detecting unit detects connection based on the detection light current.

Thus, with the connection detection function provided to the optical transmission system according to the embodiments, the electric energy will not propagate through a connection cable or the like. Hence, the electromagnetic noise will not be emitted. Further, the connection detection function can be realized with an extremely simple structure and detects the connection with minimum power consumption. In particular, in the responding unit, the detection light can be emitted using only the light energy of the excitation light. Accordingly, the responding unit can substantially eliminate power consumption for the operation of the connection detection function.

2. First Embodiment

2-1. Structure

FIG. 1 is a block diagram of an optical transmission system 100 according to a first embodiment. The optical transmission system 100 is structured to include a transmitting apparatus 1, an optical cable 2 as an optical transmission path, and a receiving apparatus 3.

The transmitting apparatus 1 includes a light emitting element for signal transmission 109 (hereinafter referred to as "signal transmitting unit"), and the receiving apparatus 3 includes a light receiving element for signal reception 303 (hereinafter referred to as "signal receiving unit") in order for the system to realize the function of optically transmitting information such as digital data. The signal transmitting unit 109 is a semiconductor laser light source, for example. The optical cable 2 may be a multicore (multifiber) optical cable including a first optical fiber 201 and a second optical fiber 203. For optically transmitting information such as digital data, the second optical fiber 203 may chiefly be used. The signal receiving unit 303 is an optical detector such as a photodiode or a phototransistor, for example.

In addition to the signal transmitting unit 109, the transmitting apparatus 1 includes: in order to achieve the connection detection function, a light emitting element for connection detection 101 (hereinafter referred to as "sending unit") that emits excitation light that includes light of a prescribed wavelength; a light receiving element for connection detection 103 (hereinafter referred to as "response receiving unit") that receives the detection light sent from the receiving apparatus 3 via the optical transmission path 2 and outputs a detection light current reflecting the intensity of the detection light; and a connection detecting unit 105 (hereinafter referred to as "detecting unit") that detects absence/presence of connection based on the detection light current.

Based on the detection light current, the detecting unit 105 outputs to the transmission circuit unit 107 the result of the connection detection as a connection detection signal. The transmission circuit unit 107 generates a drive current based on the connection detection signal and an externally received transmission signal (i.e., a signal representing information to be transmitted such as digital data) and outputs the drive current to the signal transmitting unit 109, to thereby control the driving operation of the signal transmitting unit 109. The transmission circuit unit 107 may include a driver circuit for a laser light source. The transmission circuit unit 107 may include an encoder circuit or the like. The signal transmitting unit 109 converts the drive current into light signal. The light signal enters the second optical fiber 203, to be sent to the receiving apparatus 3.

In the present embodiment, the sending unit 101 may be a light emitting diode. The sending unit 101 emits excitation light including light of a prescribed wavelength to the optical transmission path. The excitation light emitted from the sending unit 101 propagates through the optical transmission path 2.

In the present embodiment, the response receiving unit 103 may be an optical detector which outputs a current corresponding to the intensity of incident light. The optical detector is only required to be capable of outputting a detection light current that corresponds to the intensity of incident light (e.g., the detection light), and the optical detector is, e.g., a photodiode, a phototransistor or the like.

The optical transmission path 2 is a multicore (multifiber) optical cable as described above. Through the first optical fiber 201, the excitation light that the sending unit 101 of the transmitting apparatus 1 has emitted and the excitation light (detection light) that has been deflected by a responding unit 301 of the receiving apparatus 2 and has re-entered the optical transmission path 2 propagate. Through the second optical fiber 203, the light signal that the signal transmitting unit 109 of the transmitting apparatus 1 has emitted propagates. It is to be noted that, the optical transmission path 2 may be an optical waveguide.

The receiving apparatus 3 includes, in addition to the signal receiving unit 303, as the structure for achieving the connection detection function, a deflecting unit 301 (the responding unit) that receives the excitation light having propagated through the first optical fiber 201 and deflects the propagation direction of the excitation light in the direction of the first optical fiber 201 so that the deflected excitation light enters the first optical fiber 201 as detection light.

In the present embodiment, the responding unit 301 may be a light deflecting element, e.g., a light reflector that excellently reflects the excitation light that the sending unit 101 emits. The light reflector includes, for example, a mirror.

The excitation light entering the responding unit 301 is deflected in the direction of the optical transmission path 2 by the responding unit 301, to thereby re-enter the optical transmission path 2 (e.g., the first optical fiber 201) as detection light. The detection light propagates through the optical transmission path 2, and is received by the response receiving unit 103 of the transmitting apparatus 1.

It is to be noted that, the optical transmission path 2 of the optical transmission system 100 may include a third optical fiber such that the excitation light having propagated through the first optical fiber 201 and entered the responding unit 301 is deflected by the responding unit 301 such that the deflected excitation light enters the third optical fiber (not-shown). In this case, the response receiving unit 103 of the transmitting apparatus 1 may be arranged such that it can excellently receive the light output from the not-shown third optical fiber.

The signal receiving unit 303 outputs a light signal current that corresponds to the received light signal. The reception circuit unit 305 outputs a reception signal based on the light signal current. The reception circuit unit 305 includes a discrimination circuit, and may include a decoder circuit or the like, as necessary.

2-2. Operation

Next, with reference to FIGS. 2A, 2B, 2C, and 3, a description will be given of the operation of the connection detection function.

When detecting connection, the sending unit 101 of the transmitting apparatus 1 outputs excitation light 401. At this time point, whether or not the transmitting apparatus 1 and the receiving apparatus 3 are connected to each other is unknown. Accordingly, from the viewpoint of safety of the eyes, the transmission circuit unit 107 does not drive the signal transmitting unit 109. It is to be noted that, from the viewpoint of safety of the eyes, as the sending unit 101, a light source other than laser, e.g., a light emitting diode is employed, for example.

As shown in FIG. 2A, when the transmitting apparatus 1 and the receiving apparatus 3 are not connected to each other via the optical transmission path 2, the excitation light 401 emitted from the first optical fiber 201 is emitted from one end of the first optical fiber 201, and propagates through the air. Accordingly, connection is not detected. Here, when the emission of light of the sending unit 101 is stopped after a lapse of a certain time, the electric power consumed by the transmitting apparatus 1 can be reduced.

Figure 2B:
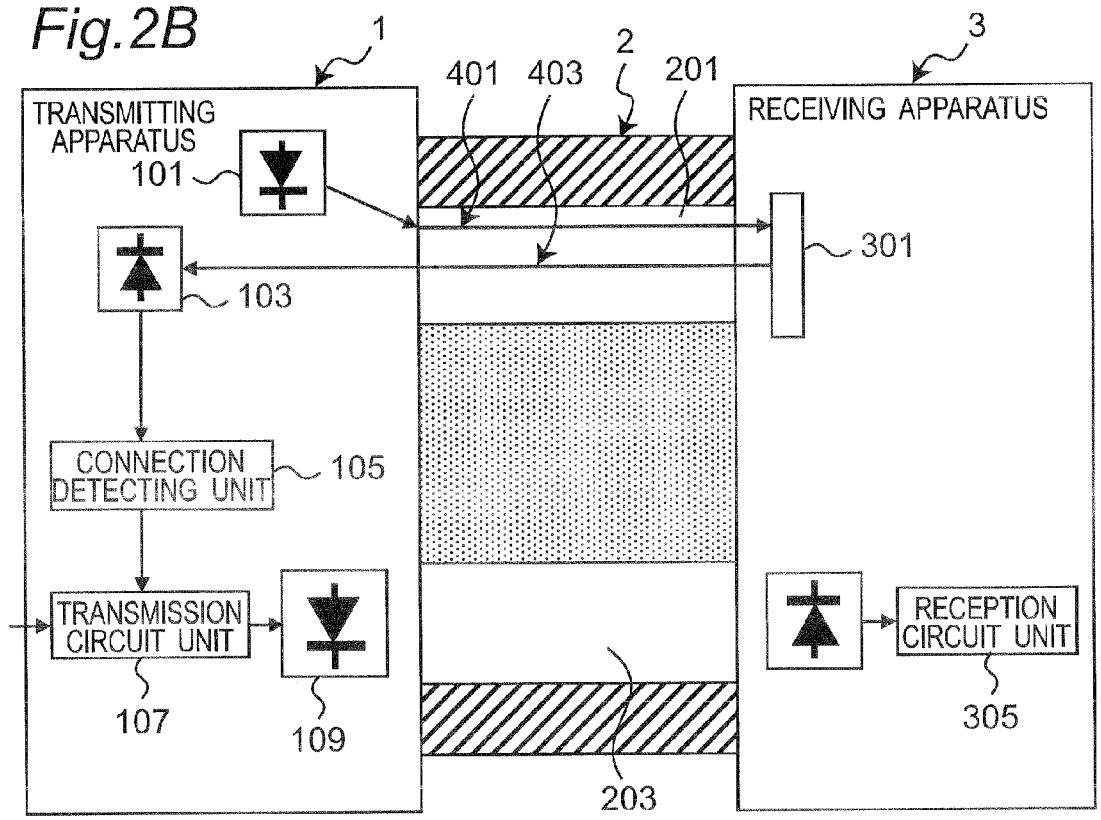
FIG. 2B is an exemplary illustration showing excitation light and detection light that propagate through the optical transmission path while connection is being detected.

On the other hand, as shown in FIG. 2B, when the transmitting apparatus 1 and the receiving apparatus 3 are connected to each other via the optical transmission path 2, the excitation light 401 emitted from the first optical fiber 201 enters the responding unit 301 of the receiving apparatus 3. For example, the responding unit 301 structured to include a mirror outputs the excitation light as being deflected (reflected). The reflection light (the detection light 403) output from the responding unit 301 re-enters the first optical fiber 201, and is received by the response receiving unit 103 of the transmitting apparatus 1.

The response receiving unit 103 outputs a detection light current corresponding to the light intensity of the detection light 403 to the detecting unit 105. Based on the detection light current, the detecting unit 105 detects that the transmitting apparatus 1 and the receiving apparatus 3 are connected to each other via the optical transmission path 2, and then outputs a connection detection signal indicative of the connection to the transmission circuit unit 107.

Figure 2C:
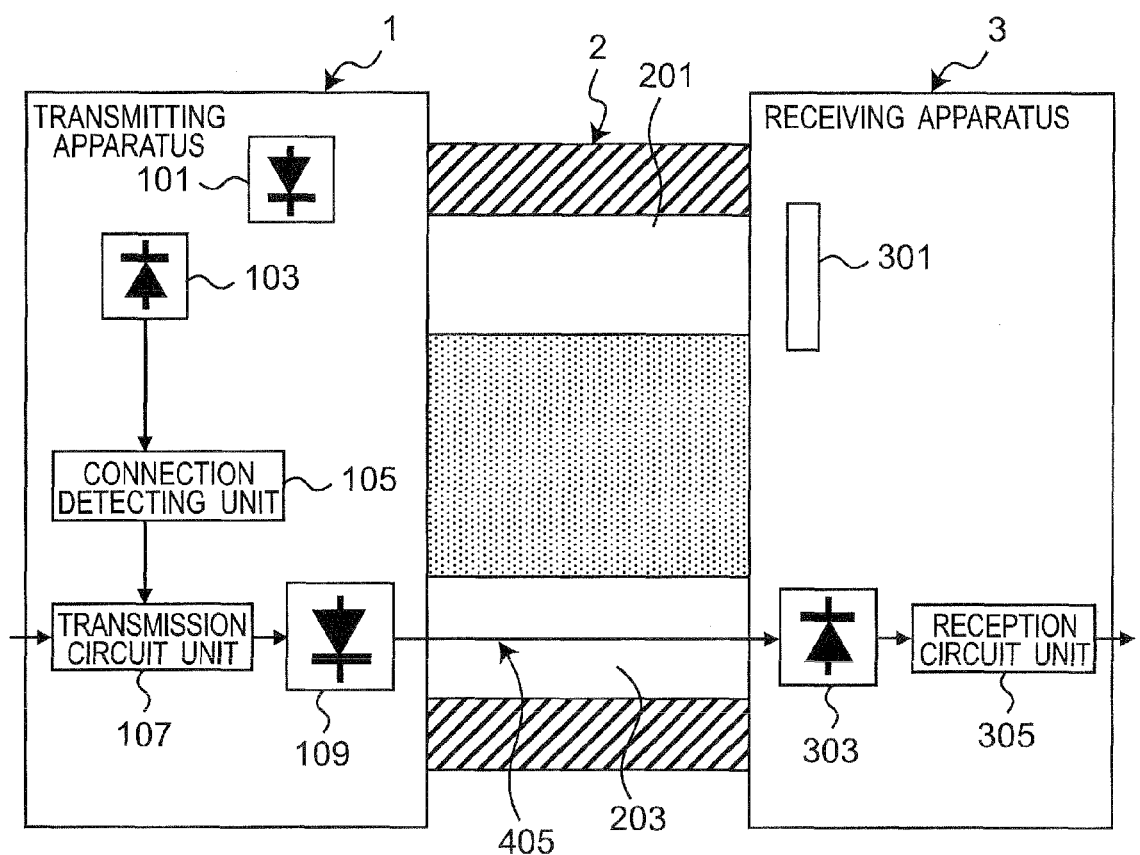
FIG. 2C is an exemplary illustration showing light signal that propagates through the optical transmission path when a data signal is transmitted.

As shown in FIG. 2C, when the transmission circuit unit 107 receives the connection detection signal indicative of the connection, the transmission circuit unit 107 generates a drive current based on an externally received transmission signal, and outputs the drive current to the signal transmitting unit 109. Then, the light emitting element for signal transmission 109 receives the drive current and outputs light signal 405. The light signal 405 propagates through the second optical fiber 203, and is received by the signal receiving unit 303 of the receiving apparatus 3. In this manner, the optical transmission of information is started. Here, by stopping the sending unit 101 to emit light, the power consumed by the transmitting apparatus 1 can be reduced. In this case, the detecting unit 105 may continuously output a connection detection signal also after the reception of the detection light current is stopped.

Thus, with the optical transmission system 100 of the present embodiment, the receiving apparatus 3 receives the excitation light having been emitted by the sending unit 101 of the transmitting apparatus 1 and entered via the optical transmission path 2, and deflects (reflects) the propagation direction of the excitation light to send the light back to the transmitting apparatus 1 as the detection light, whereby the response receiving unit 103 of the transmitting apparatus 1 outputs a prescribed detection light current, and the detecting unit 105 of the transmitting apparatus 1 detects connection to the receiving apparatus 3 based on the detection light current. When the transmitting apparatus 1 detects that the receiving apparatus 3 is connected via the optical transmission path 2, the transmitting apparatus 1 starts optical transmission of information using the signal transmitting unit 109.

Figure 3A:
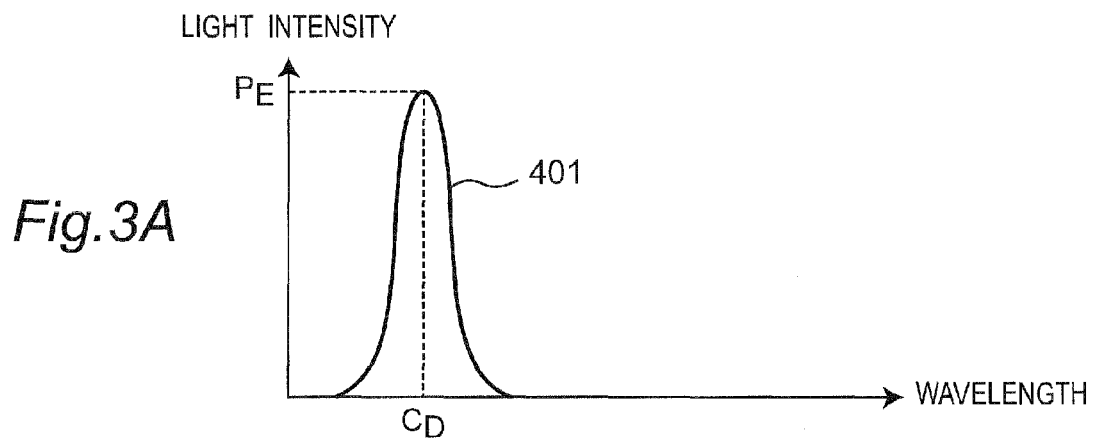
FIGS. 3A, 3B, and 3C are: a characteristic diagram of excitation light that a sending unit (a light emitting element for connection detection) emits; a characteristic diagram of light entering a response receiving unit (a light receiving element for connection detection) when a receiving apparatus is not connected; and a characteristic diagram of detection light entering the response receiving unit when the receiving apparatus is connected.
Figure 3B:
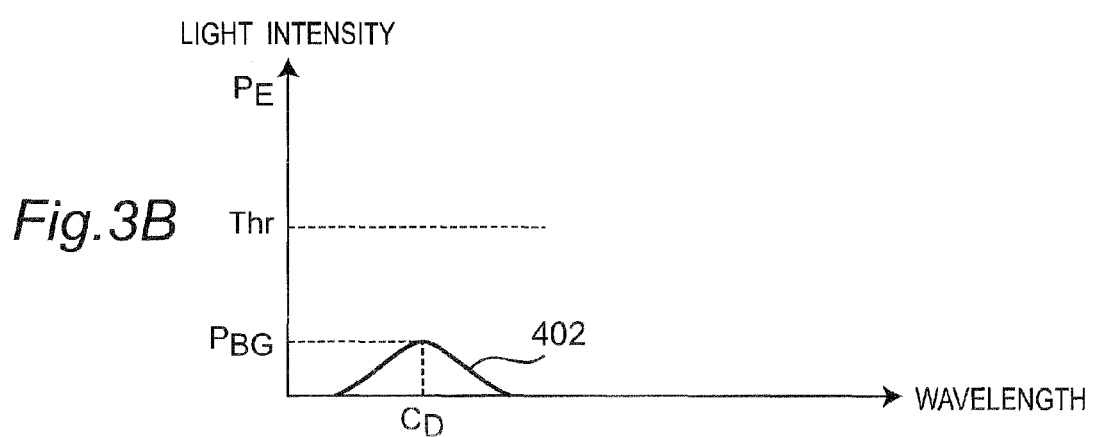
Figure 3C:
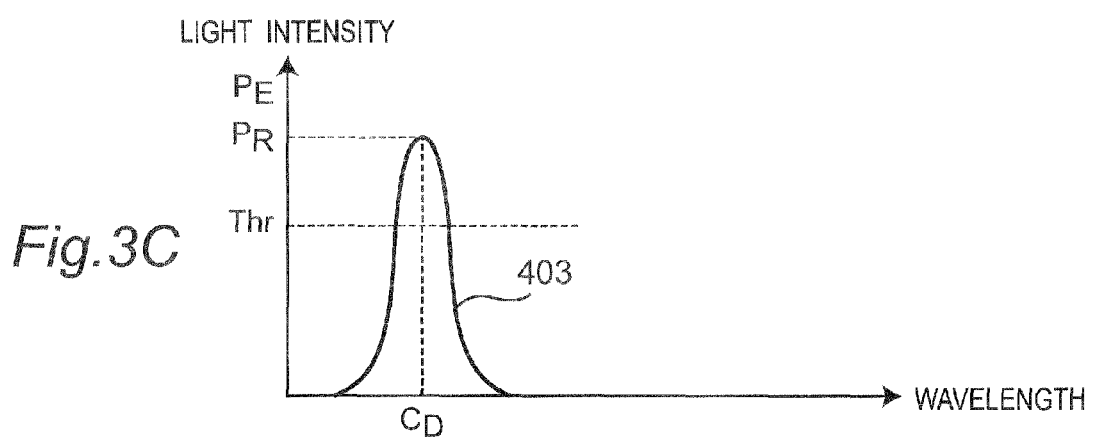
Figure 4:
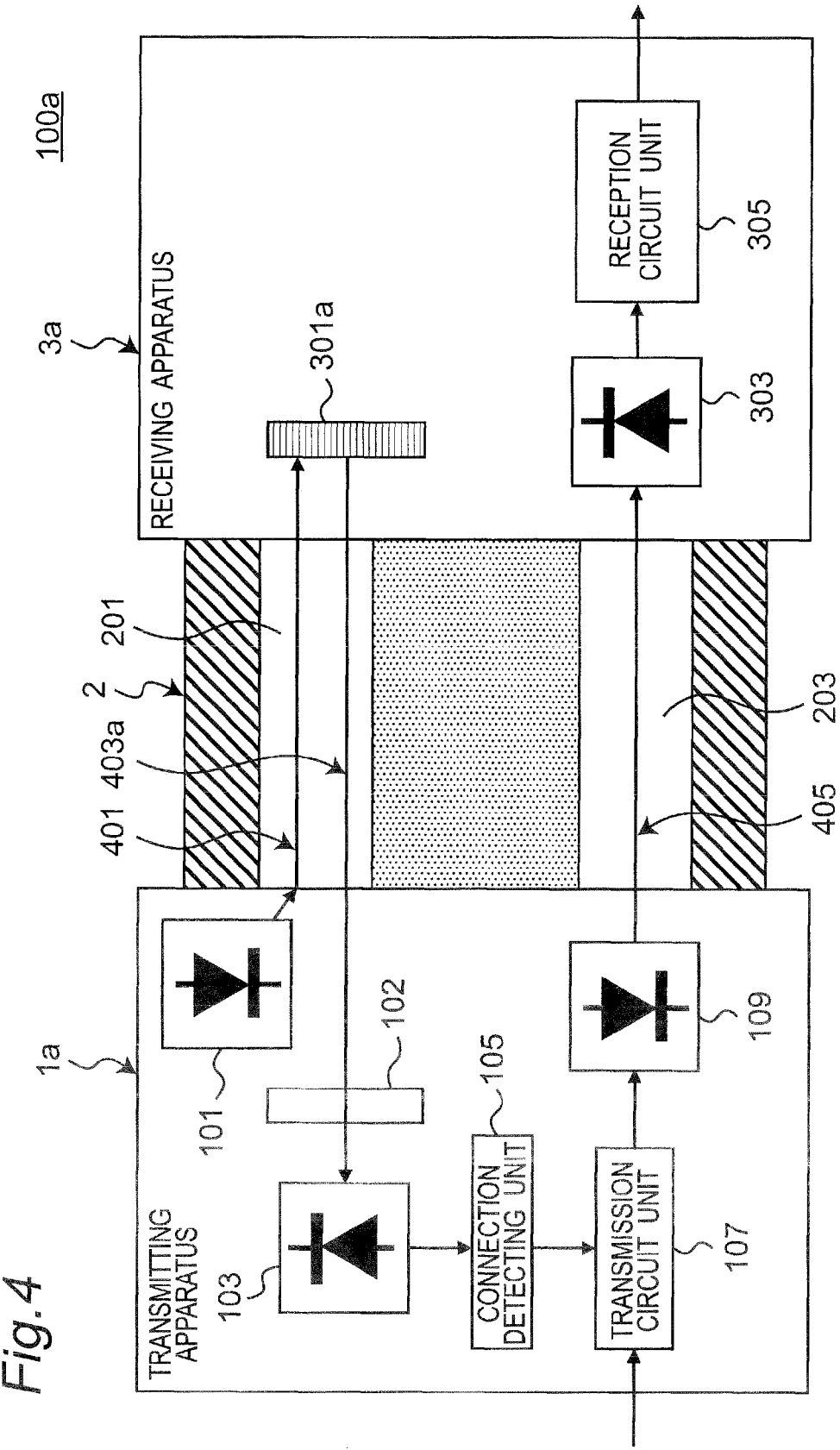
FIG. 4 is a schematic diagram of an optical transmission system according to a second embodiment.

FIG. 3A is an exemplary illustration of the spectrum characteristic of the excitation light that the sending unit 101 outputs. FIGS. 3B and 3C are each an exemplary illustration of the spectrum characteristic of light entering the response receiving unit 103. FIG. 3B is an exemplary illustration of the spectrum characteristic of light entering the response receiving unit 103 when the receiving apparatus 3 is not connected to the optical transmission path 2. On the other hand, FIG. 3C is an exemplary illustration of the spectrum characteristic entering the response receiving unit 103 when the receiving apparatus 3 is connected to the optical transmission path 2.

As shown in FIG. 3A, the sending unit 101 outputs the excitation light 401 that has the light intensity peak (intensity $P_E$) at a prescribed wavelength $C_D$.

As shown in FIG. 3B, even when the receiving apparatus 3 is not connected to the optical transmission path 2, by the reflection at the interface between the transmitting apparatus 1 and the optical transmission path 2 or the like, the response receiving unit 103 may receive a slight amount of part of the excitation light (background light) 402. Here, it is assumed that the background light 402 has a light intensity $P_{BG}$ at the wavelength $C_D$.

On the other hand, as shown in FIG. 3C, when the receiving apparatus 3 is connected to the optical transmission path 2, the detection light 403 emitted from the responding unit 301 enters the response receiving unit 103. Here, it is assumed that the detection light 403 has a light intensity $P_R$ at the wavelength $C_D$.

The response receiving unit 103 outputs a current (i.e., the detection light current) having the magnitude corresponding to the light intensity of the incident light (i.e., the background light 402 or the detection light 403) to the detecting unit 105. Accordingly, in the case where the detecting unit 105 receives the current equal to or greater than a prescribed magnitude, the detecting unit 105 detects that the receiving apparatus 3 is connected to the optical transmission path 2, and outputs a connection detection signal indicative of the connection to the transmission circuit unit 107. Here, in the case where the response receiving unit 103 receives a current having the magnitude equal to or greater than the current value of the detection light current which is output when the light having the light intensity threshold value Thr is received, the detecting unit 105 may output a connection detection signal to the transmission circuit unit 107. The light intensity threshold value Thr may be set to be well greater than the light intensity $P_{BG}$ of the background light 402 and to be well smaller than the light intensity $P_R$ of the detection light 403.

Thus, with the optical transmission system 100 according to the first embodiment, the excitation light that the sending unit 101 outputs is received by the responding unit 301, which uses solely the light energy of the received excitation light to generate detection light, such that the detection light re-enters the optical transmission path 2. The detection light is received by the response receiving unit 103, and converted into a detection light current corresponding to the intensity of the received light. The detecting unit 105 detects connection of the receiving apparatus 3 based on the magnitude of the detection light current.

In this manner, the optical transmission system 100 according to the present embodiment can detect the connection without causing the electric energy to propagate through the connection cable (the optical transmission path 2). Further, the responding unit 301 arranged at the receiving apparatus 3 is structured with the deflecting unit 301 that reflects (deflects) the received light. Accordingly, the power consumption in the responding unit 301 is substantially zero. Hence, with the optical transmission system 100 according to the present embodiment, the connection detection function can be realized with the very simple structure and with the minimum power consumption.

It is to be noted that, in order to detect the case where the transmitting apparatus 1 and the optical transmission path 2 are disconnected from each other, or the case where the optical transmission path 2 is broken after the transmission of the light signal is started, the connection detection operation described above is repeatedly performed at prescribed time intervals, and transmission of the light signal may be stopped in the case where connection is not detected.

It is to be noted that, in the foregoing, though the description has been given of the structure where the light signal is one channel, the light signal may be provided for two or more channels. In this case, the signal transmitting unit 109, the second optical fiber 203, and the signal receiving unit 303 may be prepared as many as the number of channels of the light signal.

3. Second Embodiment

3-1. Structure

Next, with reference to FIGS. 4 and 5A, 5B, and 5C, a description will be given of an optical transmission system 100a according to a second embodiment. It is to be noted that, the description of the structure and operations which are similar to those in the other embodiments are omitted as appropriate.

The optical transmission system 100a according to the second embodiment includes, as a responding unit 301a of the receiving apparatus 3a, a wavelength conversion element 301a. The wavelength conversion element 301a absorbs at least part of the excitation light 401, and outputs, by the absorbed light energy, detection light 403a including the light of wavelength being different from that of the excitation light 401.

The responding unit 301a can be structured using a phosphor that absorbs, for example, the light of at least part of the wavelength included in the excitation light 401, and that emits light of wavelength longer than the wavelength of the absorbed light.

It is to be noted that the peak wavelength of the detection light 403a may not necessarily be longer than the peak wavelength of the excitation light 401. When the peak wavelength of the excitation light 401 and the peak wavelength of the detection light 403a are different from each other, the optical transmission system 100a according to the present embodiment operates correctly. In this case, the responding unit 301 is not necessarily a phosphor. In this case, the responding unit 301 may be implemented using any appropriate wavelength conversion element that can emit light whose wavelength is shorter than that of the absorbed light.

Further, the optical transmission system 100a according to the second embodiment may be provided with, at the transmitting apparatus 1a, an optical filter 102 (an optical filter for the response receiving unit) that excellently blocks the excitation light 401 and that excellently transmits the detection light 403a between the response receiving unit 103 and the first optical fiber 201.

Figure 5A:
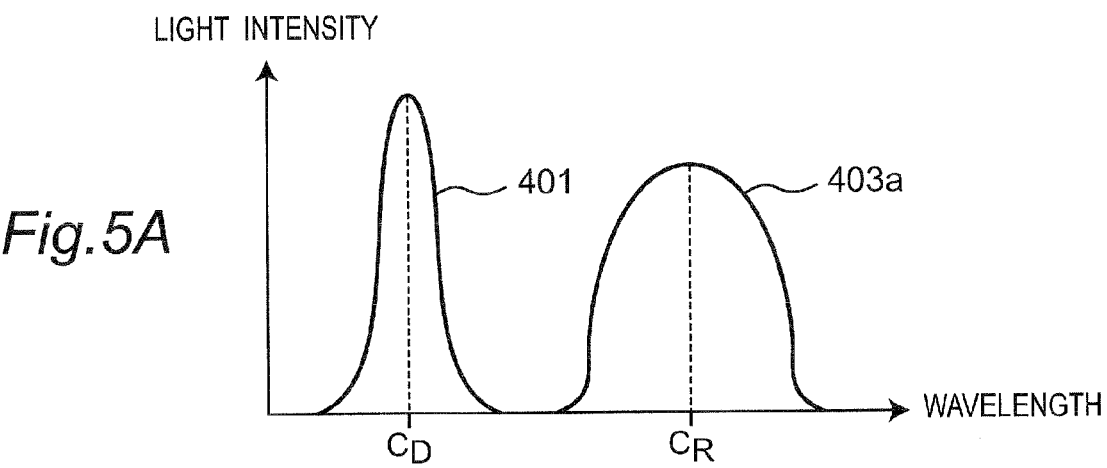
FIGS. 5A, 5B, and 5C are: a characteristic diagram of excitation light that a sending unit emits and detection light emitted from a responding unit (a reflector (a deflecting unit)) that has received the excitation light; a light transmission characteristic diagram of an optical filter for the response receiving unit; and a characteristic diagram of the light entering the response receiving unit.

FIG. 5A is an exemplary illustration of the spectrum characteristic of the excitation light 401 and the detection light 403a. The excitation light 401 is the light having the light intensity peak at the wavelength $C_D$. The detection light 403a is the light having the light intensity peak at the wavelength $C_R$. Here, though the wavelength region of the excitation light 401 and the wavelength region of the detection light 403a are shown in a manner not overlapping with each other, the excitation light 401 and the detection light 403a may include an overlapping portion in the wavelength region. In that case, the peak wavelength $C_D$ of the excitation light 401 and the peak wavelength $C_R$ of the detection light 403a may be different from each other, for example.

Figure 5B:
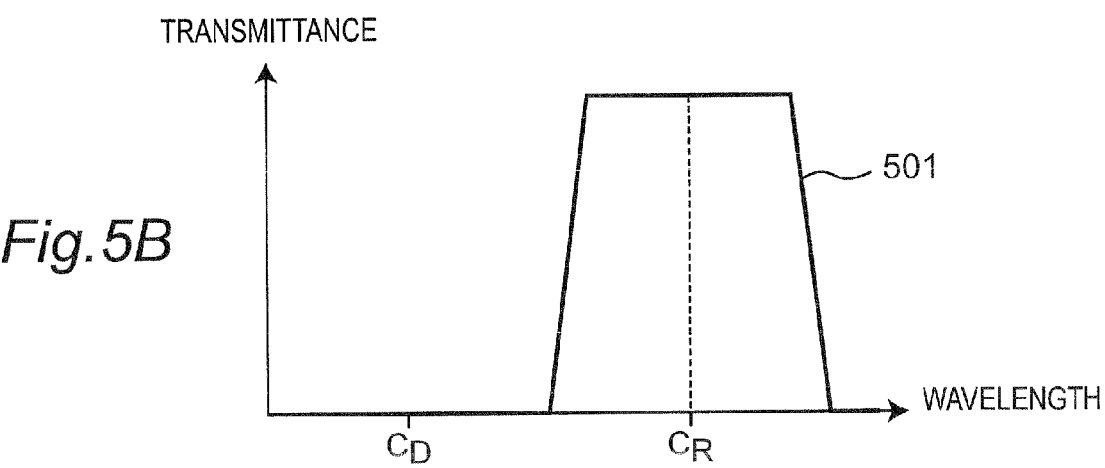

FIG. 5B shows the light transmission characteristic of the optical filter 102. As shown, the optical filter 102 may be designed such that it excellently transmits the light of the peak wavelength $C_R$ of the detection light 403a, and that it excellently blocks the light of the peak wavelength $C_D$ of the excitation light 401.

Figure 5C:
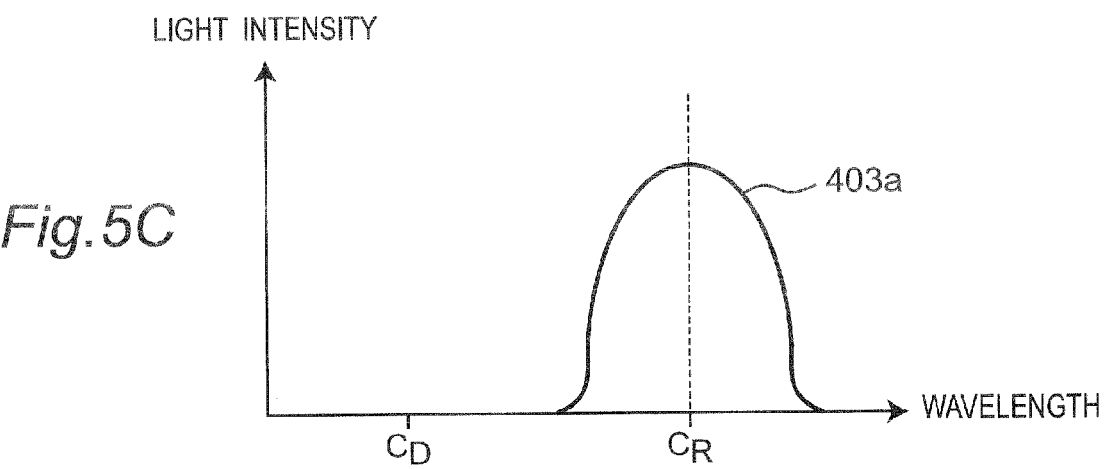

FIG. 5C is an exemplary illustration showing the characteristic diagram of light entering the response receiving unit 103. As shown, by the function of the optical filter 102, the response receiving unit 103 excellently receives the detection light 403a, but it receives the excitation light 401 very little. Therefore, detection of connection/disconnection can easily be performed.

3-2. Operation

Similarly to the first embodiment, in detecting connection, the sending unit 101 of the transmitting apparatus 1a outputs the excitation light.

In the case where the transmitting apparatus 1a and the receiving apparatus 3a are not connected to each other via the optical transmission path 2, the excitation light 401 having been output from the first optical fiber 201 is output from one end of the first optical fiber 201, and propagates through the air.

On the other hand, when the transmitting apparatus 1a and the receiving apparatus 3a are connected to each other via the optical transmission path 2, the excitation light 401 output from the first optical fiber 201 enters the responding unit 301a (the wavelength conversion element) of the receiving apparatus 3a. For example, the responding unit 301a structured to include a phosphor absorbs at least part of the excitation light, and using the absorbed light energy, outputs the light whose wavelength is longer than that of the absorbed light. The fluorescence (the detection light 403a) being output from the responding unit 301a re-enters the first optical fiber 201, and transmits through the optical filter 102, to be received by the response receiving unit 103 of the transmitting apparatus 1.

The response receiving unit 103 outputs a detection light current corresponding to the light intensity of the detection light 403 to the detecting unit 105. When the detecting unit 105 detects that the transmitting apparatus 1a and the receiving apparatus 3a are connected to each other via the optical transmission path 2 based on the detection light current, the detecting unit 105 outputs a connection detection signal indicative of connection to the transmission circuit unit 107.

When the transmission circuit unit 107 receives the connection detection signal indicative of connection, the transmission circuit unit 107 generates a drive current based on an externally received transmission signal, and outputs the drive current to the signal transmitting unit 109. Then, the light emitting element for signal transmission 109 receives the drive current and emits light signal 405. The light signal 405 propagates through the second optical fiber 203, and is received by the signal receiving unit 303 of the receiving apparatus 3a. In this manner, optical transmission of information is started.

Thus, with the optical transmission system 100a of the present embodiment, the receiving apparatus 3a absorbs the excitation light having been emitted from the sending unit 101 of the transmitting apparatus 1a and entered via the optical transmission path 2, and sends back the detection light whose wavelength is longer than the wavelength of the absorbed excitation light to the transmitting apparatus 1a as the detection light, whereby the response receiving unit 103 of the transmitting apparatus 1a outputs a prescribed detection light current. Based on the detection light current, the detecting unit 105 of the transmitting apparatus 1a detects connection to the receiving apparatus 3a. When it is detected that the receiving apparatus 3a is connected via the optical transmission path 2, the transmitting apparatus 1a starts optical transmission of information using the signal transmitting unit 109.

By the operation of the optical filter 102, the response receiving unit 103 receives excitation light 401 very little.

Therefore, connection detection that is more precise than that in the first embodiment can be carried out.

Thus, with the optical transmission system 100a according to the second embodiment, the excitation light that the sending unit 101 emits is absorbed by the responding unit 301a, and the responding unit 301a uses solely the light energy of the absorbed excitation light to generate the detection light 403a, such that the detection light 403a re-enters the optical transmission path 2.

In this manner, the optical transmission system 100a according to the present embodiment can carry out connection detection without causing the electric energy to propagate through the connection cable (the optical transmission path 2). Further, the responding unit 301a arranged at the receiving apparatus 3a is structured with the wavelength conversion element 301a that absorbs at least part of the excitation light and that emits the light whose wavelength is different from that of the excitation light. Accordingly, the power consumption at the responding unit 301a is substantially zero. Hence, with the optical transmission system 100a according to the present embodiment, the connection detection function can be realized with the very simple structure and with the minimum power consumption.

4. Third Embodiment

4-1. Structure

Next, with reference to FIGS. 6 to 9A and 9B, a description will be given of an optical transmission system 100b according to a third embodiment. It is to be noted that, the description of the structure and operations which are similar to those in the other embodiments are omitted as appropriate.

FIG. 6 is a schematic diagram of the optical transmission system 100b according to the third embodiment. The optical transmission system 100b according to the third embodiment has the structure capable of transmitting the excitation light 401 and the detection light 403a and the light signal 405 via an identical optical transmission path 2b (an optical fiber 2b) through wavelength multiplexing.

Figure 7:
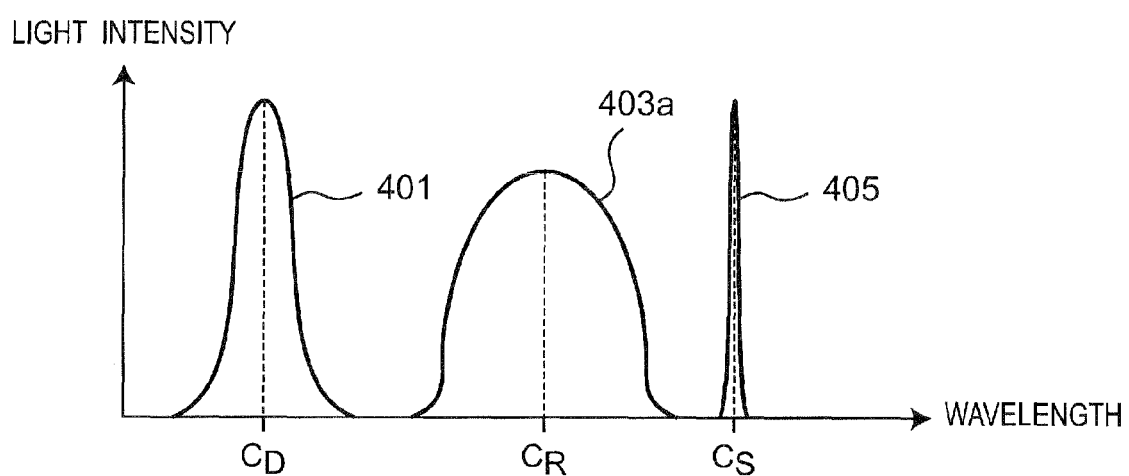
FIG. 7 is a characteristic diagram of excitation light that a sending unit emits, detection light that is emitted from a responding unit that has received the excitation light, and light signal that a signal transmitting unit (a light emitting element for signal transmission) emits.

FIG. 7 is an exemplary illustration of the spectrum characteristic of the excitation light 401, the detection light 403a, and the light signal 405 according the present embodiment. The excitation light 401 is the light having the peak wavelength $C_D$, and the detection light 403a is the light having the peak wavelength $C_R$ similarly to the second embodiment. Here, the light signal 405 is the laser light having a peak wavelength $C_S$ which is different from the wavelength $C_D$ and the wavelength $C_R$.

Returning back to FIG. 6, a transmitting apparatus 1b includes a first optical wavelength multiplexing and demultiplexing filter 111 that multiplexes or demultiplexes light. The first optical wavelength multiplexing and demultiplexing filter 111 includes: an optical filter for the sending unit 102a between the sending unit 101 and the optical transmission path 2b; a optical filter for the response receiving unit 102 between the response receiving unit 103 and the optical transmission path 2b; and a optical filter for the signal transmitting unit 102b between the signal transmitting unit 109 and the optical transmission path 2b.

Figure 8A:
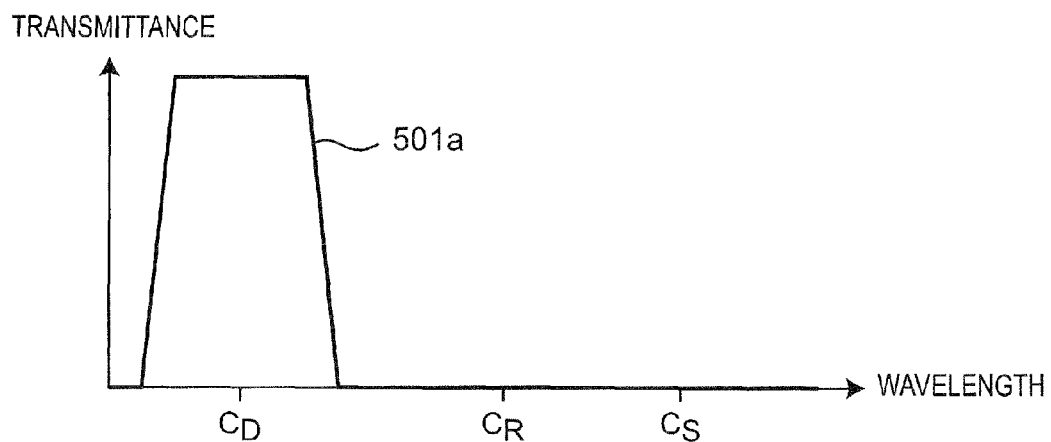
FIGS. 8A, 8B, and 8C are: a light transmission characteristic diagram of an optical filter for the sending unit of an optical wavelength multiplexing and demultiplexing filter in the transmitting apparatus; a light transmission characteristic diagram of an optical filter for the response receiving unit of the same; a light transmission characteristic diagram of an optical filter for the signal transmitting unit of the same.

FIG. 8A is a light transmission characteristic diagram of the optical filter for the sending unit 102a. As shown, the optical filter for the sending unit 102a excellently transmits the light of the peak wavelength $C_D$ of the excitation light, and transmits the light of the peak wavelength $C_R$ of the detection light 403a and the light of the peak wavelength $C_S$ of the light signal 405 very little. Therefore, the excitation light 401 can enter the optical transmission path 2b without any loss.

Figure 8B:
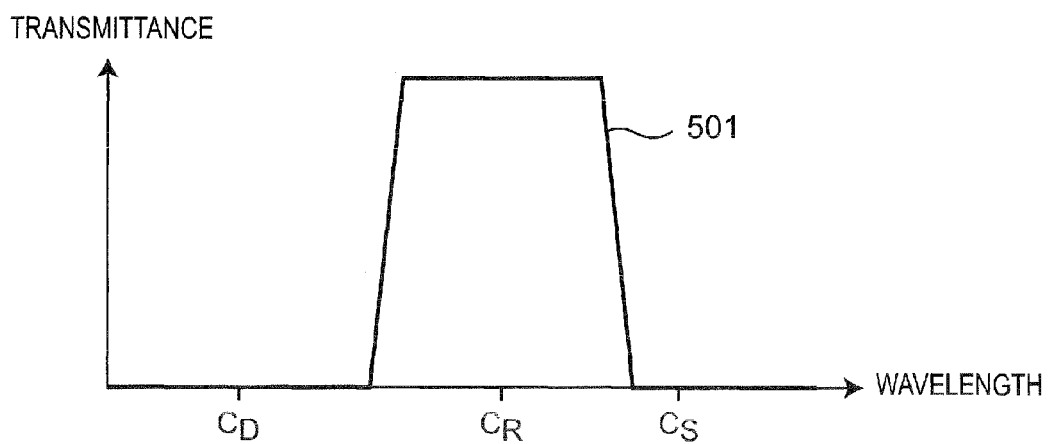

FIG. 8B is a light transmission characteristic diagram of the optical filter for the response receiving unit 102. As shown, the optical filter for the response receiving unit 102 excellently transmits the light of the peak wavelength $C_R$ of the detection light 403a, and transmits the light of the peak wavelength $C_D$ of the excitation light and the peak wavelength $C_S$ of the light signal 405 very little. Accordingly, it becomes possible to allow only the detection light 403a to enter the response receiving unit 103, and detection of connection/disconnection can precisely and easily be performed.

Figure 8C:
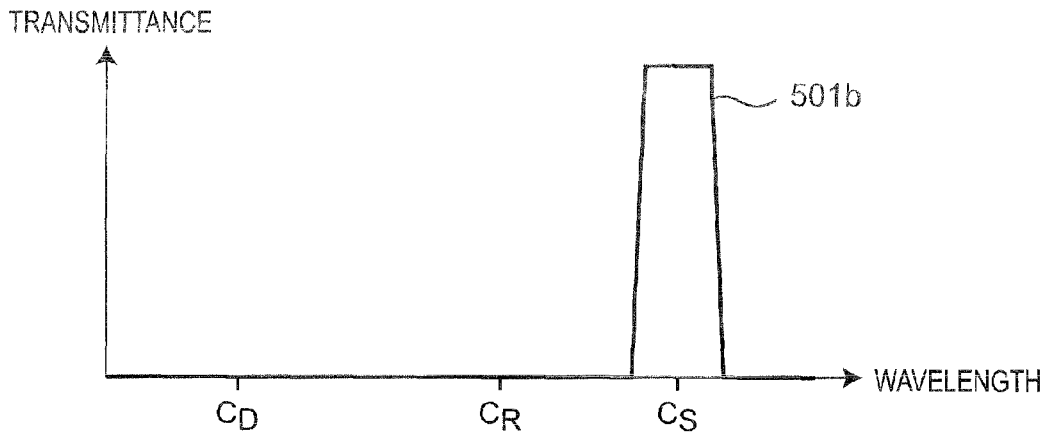

FIG. 8C is a light transmission characteristic diagram of the optical filter for the signal transmitting unit 102b. As shown, the optical filter for the signal transmitting unit 102b excellently transmits the light of the peak wavelength $C_S$ of the light signal 405, and transmits the light of the peak wavelength $C_R$ of the detection light 403a and the light of the peak wavelength $C_D$ of the excitation light very little. Accordingly, the light signal 405 can enter the optical transmission path 2b without any loss.

Next, returning back to FIG. 6, a description will be given of the structure of the receiving apparatus 3b. The receiving apparatus 3b includes a second optical wavelength multiplexing and demultiplexing filter 307 that multiplexes or demultiplexes light. The second optical wavelength multiplexing and demultiplexing filter 307 includes a optical filter for the responding unit 309a between the responding unit 301a and the optical transmission path 2b, and a signal receiving unit-use optical filter 309b between the signal receiving unit 303 and the optical transmission path 2b.

Figure 9A:
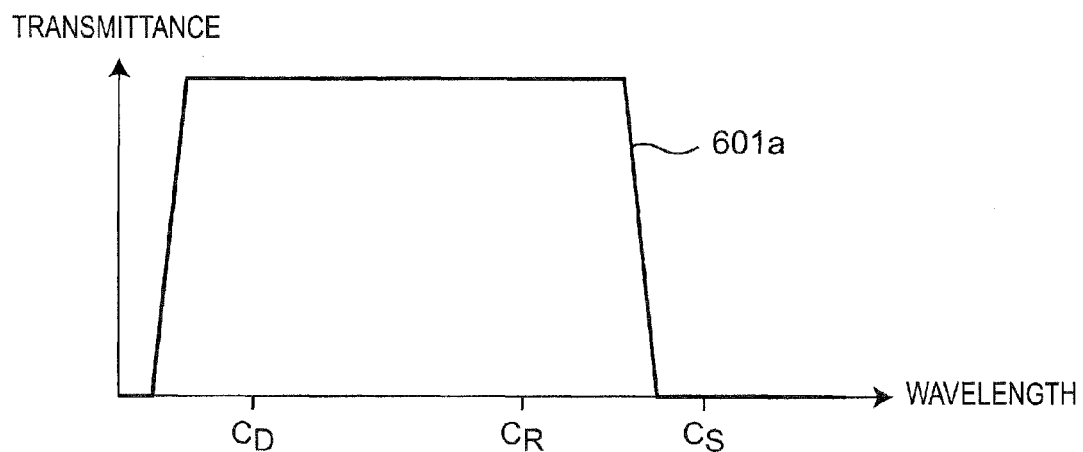
FIGS. 9A and 9B are: a light transmission characteristic diagram of an optical filter for the responding unit of an optical wavelength multiplexing and demultiplexing filter in the receiving apparatus; and a light transmission characteristic diagram of an optical filter for the signal receiving unit (for a light receiving element for signal reception) of the same.

FIG. 9A is a light transmission characteristic diagram of the optical filter for the responding unit 309a. As shown, the optical filter for the responding unit 309a excellently transmits the light of the peak wavelength $C_D$ of the excitation light and the light of the peak wavelength $C_R$ of the detection light 403a, and transmits the light of the peak wavelength $C_S$ of the light signal 405 very little. Accordingly, the excitation light 401 can enter the responding unit 301a without any loss, and the detection light 405 that the responding unit 301a emits can similarly enter the optical transmission path 2b without any loss.

Figure 9B:
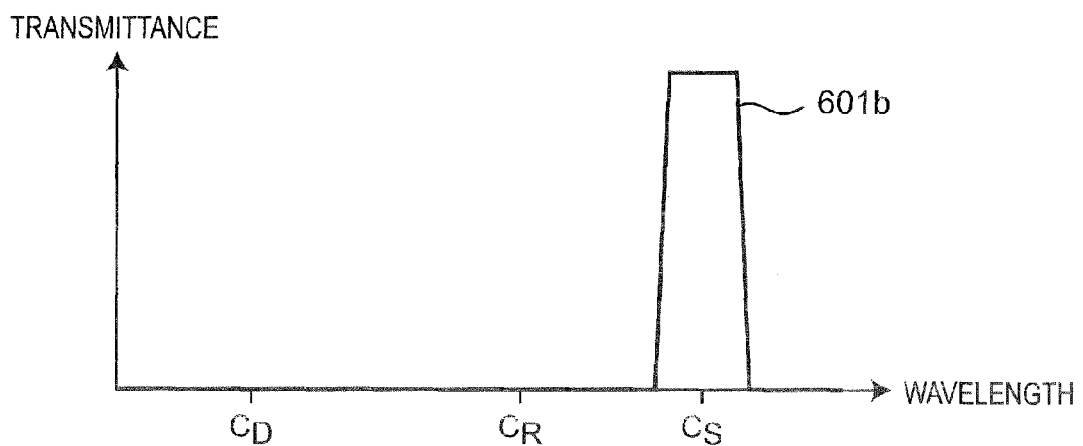

FIG. 9B is a light transmission characteristic diagram of the signal receiving unit-use optical filter 309b. As shown, the signal receiving unit-use optical filter 309b excellently transmit the light of the peak wavelength $C_S$ of the light signal 405, and transmits the light of the peak wavelength $C_D$ of the excitation light and the light of the peak wavelength $C_R$ of the detection light 403a very little. Accordingly, the light signal 405 can enter the signal receiving unit 103 without any loss.

4-2. Operation

Similarly to the foregoing embodiments, the optical transmission system 100b according to the present embodiment also can perform connection detection. In the present embodiment, using one single optical transmission path 2b, connection detection and optical transmission of information can be performed. With such a structure, the number of the optical fibers (the optical transmission paths) in the optical cable can be reduced.

5. Fourth Embodiment

5-1. Structure

Figure 10:
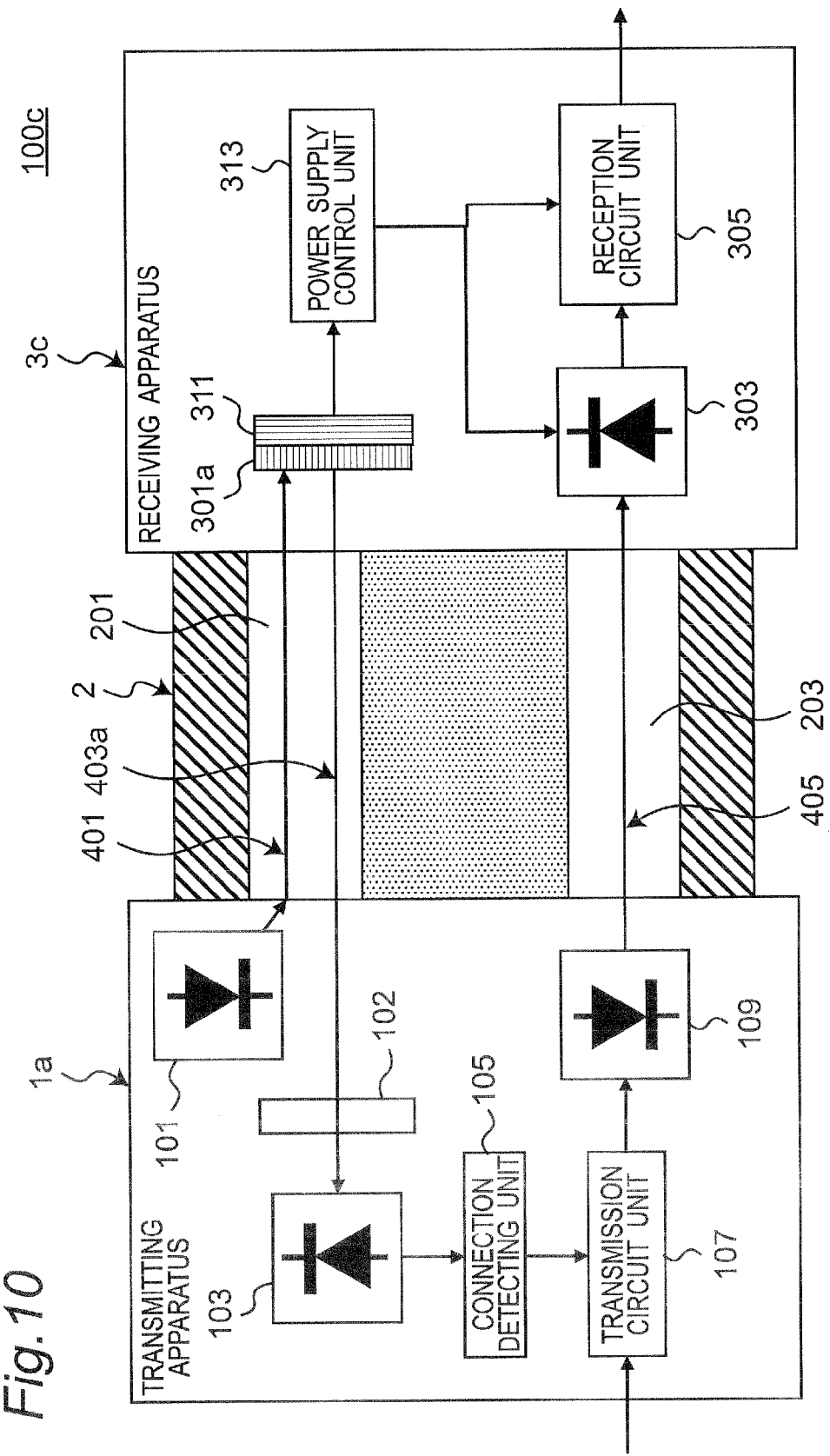
FIG. 10 is a schematic diagram of an optical transmission system according to a fourth embodiment.

Next, with reference to FIG. 10, a description will be given of an optical transmission system 100c according to a fourth embodiment. It is to be noted that, the description of the structure and operations which are similar to those in the other embodiments are omitted as appropriate.

The optical transmission system 100c according to the present embodiment further includes a structure for activating the signal receiving unit 303 and the reception circuit unit 305 of the receiving apparatus 3c in response to reception of the excitation light. Thus, according to the present embodiment, power consumption required for the operation of the signal receiving unit 303 and the reception circuit unit 305 of the receiving apparatus 3c can be suppressed. That is, with the optical transmission system 100c according to the present embodiment, the operations of the signal receiving unit 303 and the reception circuit unit 305 of the receiving apparatus 3c can be stopped until transmission and reception of a signal is actually carried out, whereby a reduction in the power consumption can be expected.

The receiving apparatus 3c includes, at the responding unit 301a, a solar battery 311 in addition to the wavelength conversion element 301a. The solar battery 311 absorbs at least part of the excitation light, to generate electromotive force.

The output voltage or the output current from the solar battery 311 is input to the power supply control unit 313.

The power supply control unit 313 monitors the input from the solar battery 311, to thereby monitor whether or not the solar battery 311 receives the excitation light 401. Further, the power supply control unit 313 can control ON/OFF of power supply to the signal receiving unit 303 and the reception circuit unit 305.

When the power supply control unit 313 recognizes that the solar battery 311 has received the excitation light 401, the power supply control unit 313 determines that the receiving apparatus 3c and the transmitting apparatus 1a are connected to each other via the optical transmission path 2, and starts power supply to the signal receiving unit 303 and the reception circuit unit 305.

It is to be noted that the similar function can be realized by using a photodiode in place of the solar battery 311.

5-2. Variation

Figure 11:
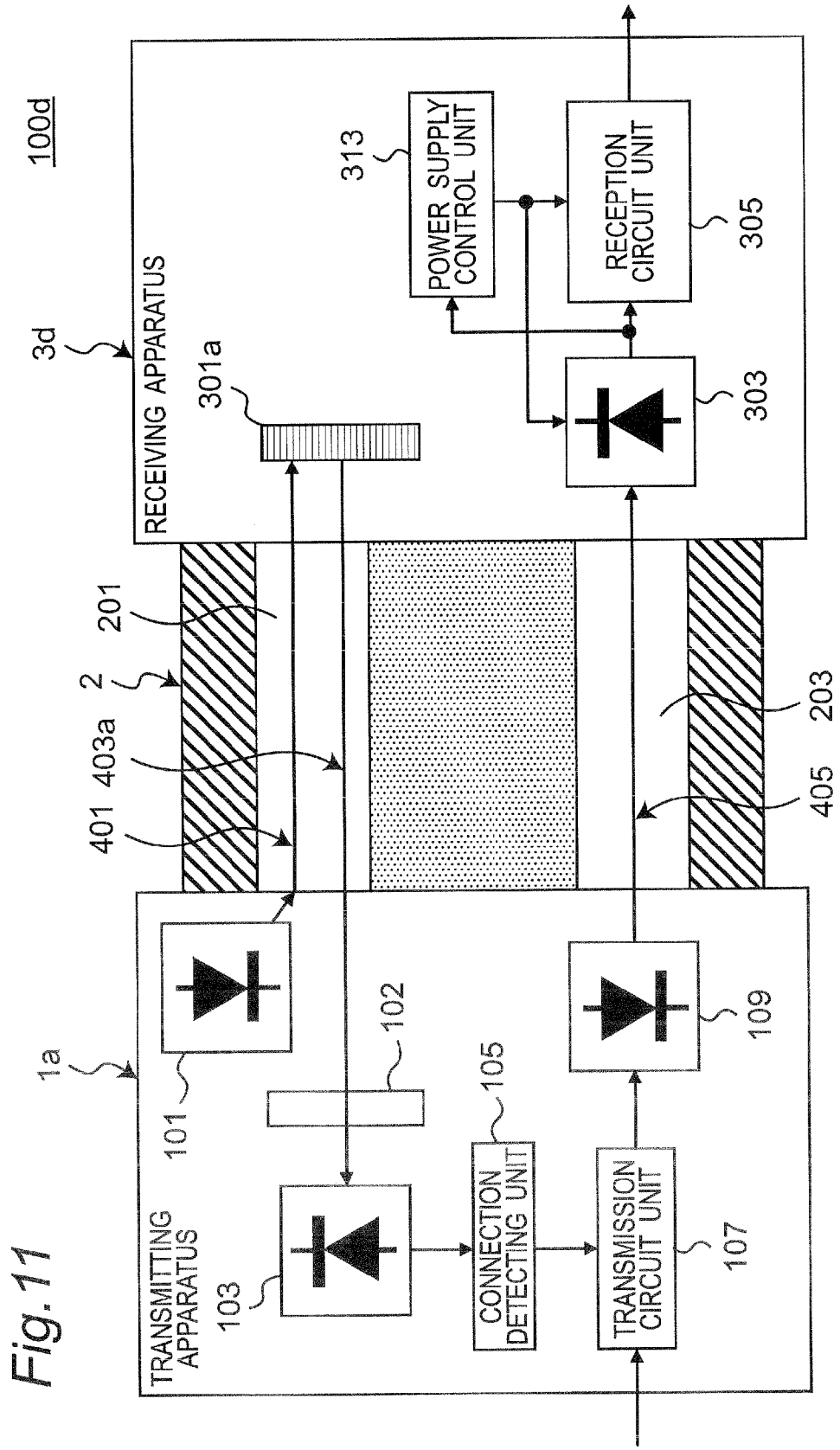
FIG. 11 is a schematic diagram of an optical transmission system according to a variation of the fourth embodiment.

FIG. 11 is a schematic diagram showing a variation 100d of the optical transmission system according to the fourth embodiment.

Similarly to the optical transmission system 100c, the optical transmission system 100d according to the present variation includes the power supply control unit 313. The power supply control unit 313 monitors the output from the signal receiving unit 303.

In the present variation, the power supply control unit 313 monitors whether or not the signal receiving unit 303 receives the light signal 405. The power supply control unit 313 controls power supply such that power is not supplied to the signal receiving unit 303 and the reception circuit unit 305 until reception of the light signal 405 by the signal receiving unit 303 is recognized.

Hence, at the very first stage of receiving the light signal 405, the signal receiving unit 303 is not supplied with power. In this state, when the signal receiving unit 303 receives the light signal 405, a weak light signal current is output from the signal receiving unit 303. When the power supply monitoring unit 313 recognizes the output of this weak light signal current, the power supply monitoring unit 313 starts supplying power to the signal receiving unit 303 and the reception circuit unit 305.

It is to be noted that, though the signal receiving unit 303 (e.g., a photodetector) in the no-power supply state does not have a response speed enough to obtain a fast-speed signal waveform, it is sufficient for detecting the presence/absence of the light signal. By the power supply control unit 213 monitoring the weak light signal current output from the signal receiving unit 303 in the no-power supply state to detect a light signal current, upon which the power supply control unit 313 starts power supply to the signal receiving unit 303 and the reception circuit unit 305, the signal receiving unit 303 and the reception circuit unit 305 can be activated only when the signal is transmitted.

Further, by the transmitting apparatus 1a enhancing the intensity of the light signal so as to be greater for a prescribed period from start of transmission of the light signal than in the normal signal transmission mode, it becomes possible for the power supply control unit 313 to more surely detect presence/absence of the light signal. The prescribed period is only required to be longer than the period required for the power supply control unit 313 to detect a weak light signal current.

6. Fifth Embodiment

6-1. Structure

Next, with reference to FIGS. 12, 13A and 13B, a description will be given of an optical transmission system 200 according to a fifth embodiment.

The optical transmission system 200 is capable of determining the type of connected receiving apparatus, together with performing detection of connection.

According to the present embodiment, a transmitting apparatus 1c is capable of detecting that the receiving apparatus is connected, and in furtherance thereto, the transmitting apparatus 1c is capable of determining the type of the receiving apparatus. For example, in connection with a plurality of types of receiving apparatuses which are different from one another in the receivable transmission rate or in the signal format, it is possible to determine the type of the connected receiving apparatus, so as to address the optical transmission with the receiving apparatuses of different types.

Figure 12:
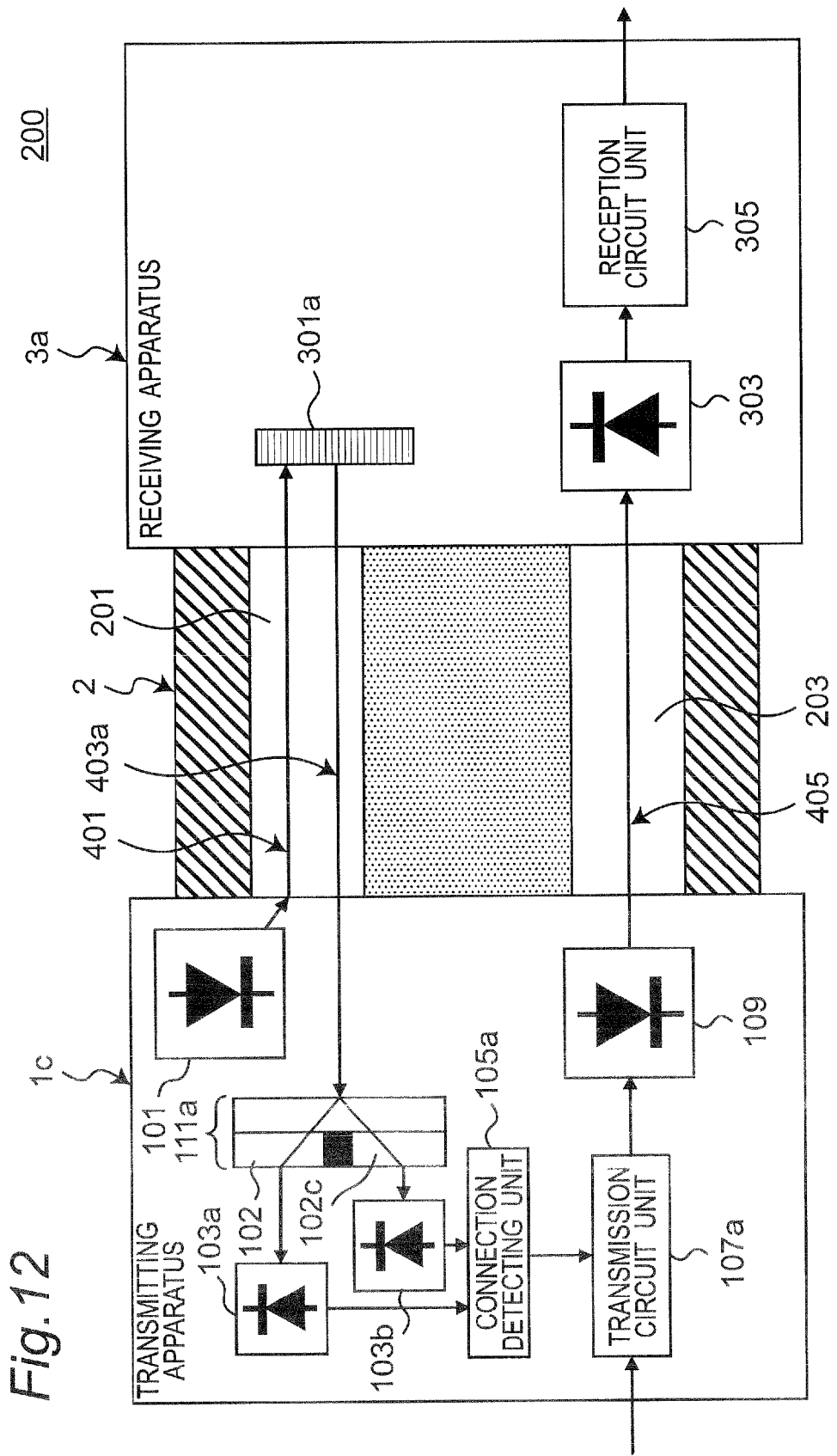
FIG. 12 is a schematic diagram of an optical transmission system according to a fifth embodiment.

FIG. 12 is a schematic diagram that describes the overview of the optical transmission system 200 according to the present embodiment. In the present embodiment, the structure for addressing two types of receiving apparatuses is shown. However, the type of the addressable receiving apparatuses is not limited to two. A person skilled in the art can easily address three or more types of receiving apparatuses based on the following description.

The transmitting apparatus 1c of the optical transmission system 200 according to the present embodiment includes a plurality of (two) response receiving units (a first response receiving unit 103a and a second response receiving unit 103b). Then, between the response receiving units 103a and 103b and the optical transmission path 2, an optical wavelength multiplexing and demultiplexing filter 111a is arranged. The optical wavelength multiplexing and demultiplexing filter 111a includes a first optical filter for the response receiving unit 102 between the first response receiving unit 103a, and a second optical filter for the response receiving unit 102c between the second response receiving unit 103b.

The first optical filter for the response receiving unit 102 is an optical filter that excellently transmits the light around a prescribed first wavelength, and that excellently blocks the rest of the light.

The second optical filter for the response receiving unit 102c is an optical filter that excellently transmits the light around a prescribed second wavelength, and that excellently blocks the rest of the light.

It is to be noted that, as the optical wavelength multiplexing and demultiplexing filter 111a, a prism or an arrayed waveguide-type optical filter that separates light for each wavelength may be employed.

Next, a description will be given of the structure on the receiving apparatus side.

The receiving apparatus includes a responding unit that can emit detection light in the wavelength band being associated with the type of the receiving apparatus, such that the type of the receiving apparatus can be distinguished.

6-2. Operation

With reference to FIG. 13A, the structure of a first type receiving apparatus 3a1 is schematically shown. The first type receiving apparatus 3a1 includes, as the responding unit, a first wavelength converter element 301a1 that absorbs the excitation light 401 and that outputs the light around a prescribed first wavelength. Hence, when the first type receiving apparatus 3a1 receives the excitation light 401, the first type receiving apparatus 3a1 outputs the light around the prescribed first wavelength as first detection light 403a1.

The first detection light 403a1 entering the transmitting apparatus 1c transmits through the first optical filter for the response receiving unit 102, but it does not transmit through the second optical filter for the response receiving unit 102c. Accordingly, the first detection light 403a1 enters only the first response receiving unit 103a.

Hence, the detecting unit 105a receives a detection light current whose magnitude is equal to or greater than a prescribed value solely from the first response receiving unit 103a. When the detecting unit 105a senses the detection light current from the first response receiving unit 103a, the detecting unit 105a outputs a first connection detection signal indicative of connection of the first type receiving apparatus 3a1 to a transmission circuit unit 107a.

Upon reception of the first connection detection signal, the transmission circuit unit 107a drives the signal transmitting unit 109 to transmit light signal suitable for the first type receiving apparatus 3a1. It is to be noted that the signal suitable for the first type receiving apparatus 3a1 is a signal that is suitable for the first type receiving apparatus 3a1 in terms of the signal format or the transmission rate. The information on the signal format or the transmission rate suitable for the first type receiving apparatus 3a1 may previously be stored in the detecting unit 105a or in the transmission circuit unit 107a.

Figure 13B:
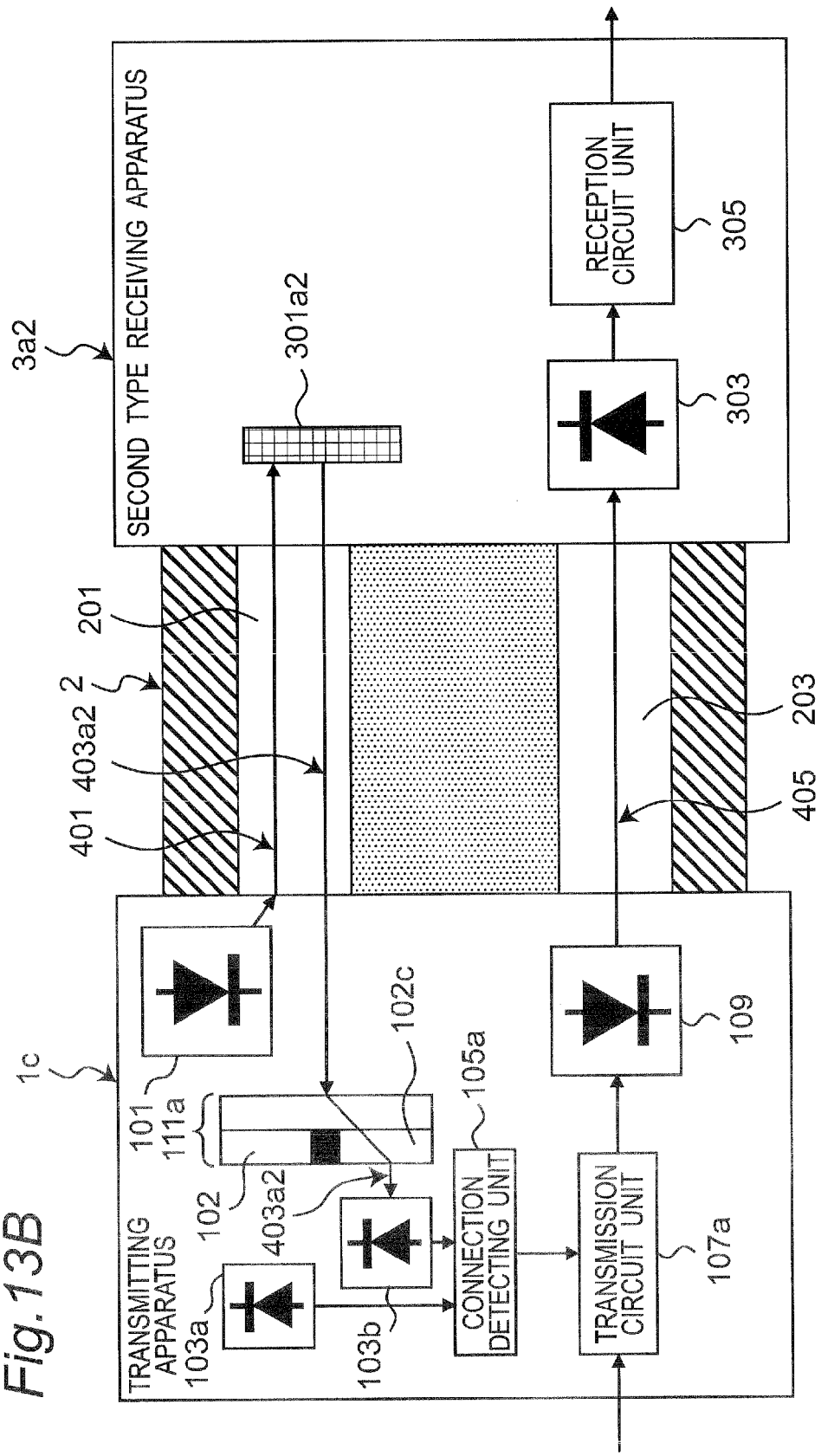
FIG. 13B is an exemplary illustration showing excitation light, detection light, and light signal propagating through an optical transmission path.

With reference to FIG. 13B, the state where the second type receiving apparatus 3a2 is connected to the transmitting apparatus 1c is schematically shown. The second type receiving apparatus 3a2 includes, as the responding unit, a second wavelength converter element 301a2 that absorbs the excitation light 401 and that emits the light around a prescribed second wavelength. Hence, when the second type receiving apparatus 3a2 receives the excitation light 401, the second type receiving apparatus 3a2 emits the light around the prescribed second wavelength as second detection light 403a2.

The second detection light 403a2 that enters the transmitting apparatus 1c transmits through the second optical filter for the response receiving unit 102c, but does not transmit through the first optical filter for the response receiving unit 102. Accordingly, the second detection light 403a2 enters solely the second response receiving unit 103b.

Hence, the detecting unit 105a receives a detection light current whose magnitude is equal to or greater than a prescribed value solely from the second response receiving unit 103b. When the detecting unit 105a detects the detection light current from the second response receiving unit 103b, the detecting unit 105a outputs a second connection detection signal indicative of connection of the second type receiving apparatus 3a2 to the transmission circuit unit 107a.

Upon reception of the second connection detection signal, the transmission circuit unit 107a drives the signal transmitting unit 109 to transmit light signal suitable for the second type receiving apparatus 3a2.

Thus, the detecting unit 105a can determine the type of the connected receiving apparatus based on the difference in the wavelength of the detection light received by the response receiving unit (103a, 103b).

In the foregoing, though the description has been given of the case where two types of receiving apparatuses (3a1, 3a2) are addressed, the types of the receiving apparatuses being addressed may be three or more types. In this case, different wavelengths of the detection light in the number as many as the types of the receiving apparatuses are allotted to respective types of the receiving apparatuses. Further, the response receiving units (103a, 103b) may be prepared as many as or more than the number of the types of the receiving apparatuses.

Further, in the present embodiment also, similarly to the foregoing embodiments, the light signal may be provided for two or more channels. In this case, the signal transmitting unit, the optical transmission path, the signal receiving unit and the like may be prepared in the number as many as the number of channels of the light signal. Further, it can be addressed to the case where the number of channels of the light signal is different depending on the type of the receiving apparatus. Further, similarly to the description having been given in connection with the foregoing embodiments, the structure in which the excitation light, the detection light, and the light signal are subjected to wavelength division multiplexing may be employed.

Further, in the present embodiment also, as has been described in the foregoing embodiments, it is possible to add the function of activating the signal receiving unit and the reception circuit unit solely upon reception of the excitation light and the light signal.

As described above, according to the present embodiment, in addition to the function of connection detection similar to the foregoing embodiments, the function of determining the type of the receiving apparatus can be realized by a very simple structure.

7. Sixth Embodiment

7-1. Structure

Next, with reference to FIGS. 14 and 15A, 15B, and 15C, a description will be given of an optical transmission system 100e according to a sixth embodiment. It is to be noted that, the description of the structure and operations which are similar to those in the other embodiments are omitted as appropriate.

As shown in FIG. 14, in the optical transmission system 100e according to the sixth embodiment, an optical filter 301b is included as the responding unit of the receiving apparatus 3e. The optical filter 301b is an optical filter that has the wavelength dependence on the light reflectance (or the light transmittance). The light reflectance of the optical filter 301b is set, in the frequency band around the peak wavelength $C_D$ of the excitation light 401, to a value that provides the reflection light of the intensity which is high enough for the transmitting apparatus 1b to detect connection of the receiving apparatus 3e upon reception of the reflection light (the detection light) from the optical filter 301b. Further, the light reflectance of the optical filter 301b is set, in the frequency band around the peak wavelength $C_S$ of the light signal 405, to a value which is low enough for the transmitting apparatus 1b to transmit data to the receiving apparatus 3e using the light signal 405. (The light transmittance of the optical filter 301b is set, in the frequency band around the peak wavelength $C_D$ of the excitation light 401, to a value low enough for the transmitting apparatus 1b to detect connection of the receiving apparatus 3e upon reception of the reflection light (the detection light) from the optical filter 301b. Further, the light transmittance of the optical filter 301b is set, in the frequency band around the peak wavelength $C_S$ of the light signal 405, to a value high enough for the transmitting apparatus 1b to transmit data to the receiving apparatus 3e using the light signal 405).

As the optical filter 301b, for example, though a fiber grating filter can be used, an optical filter of the other type may be used.

Figure 15A:
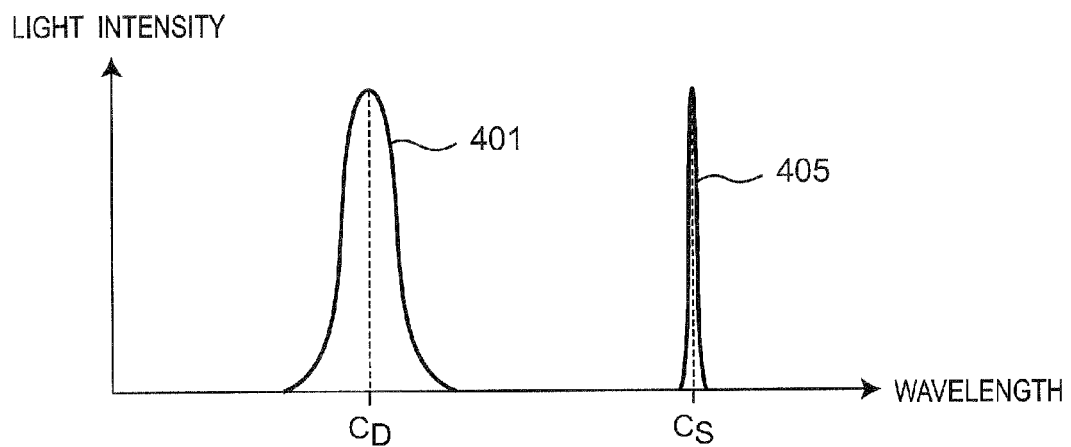
FIGS. 15A, 15B, and 15C are: characteristic diagram of excitation light and light signal; a diagram of a light reflection characteristic of an optical filter; and a diagram of a light transmission characteristics of an optical filter.
Figure 15B:
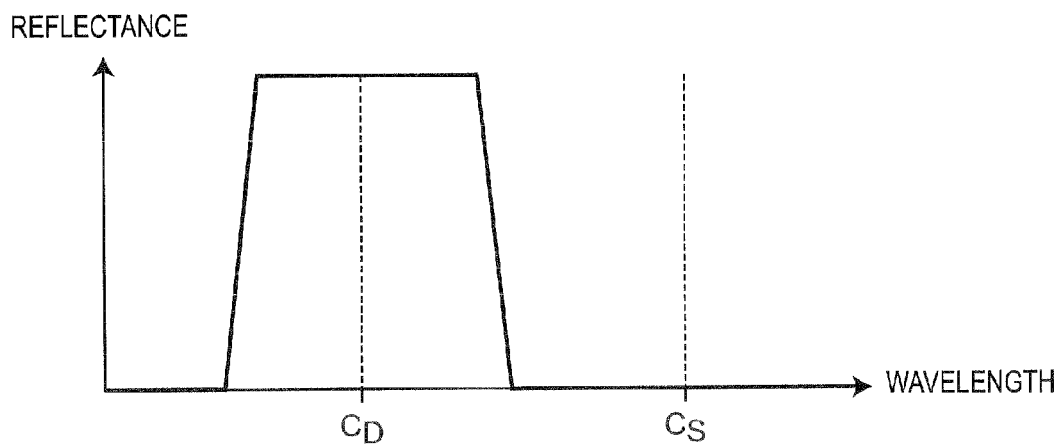
Figure 15C:
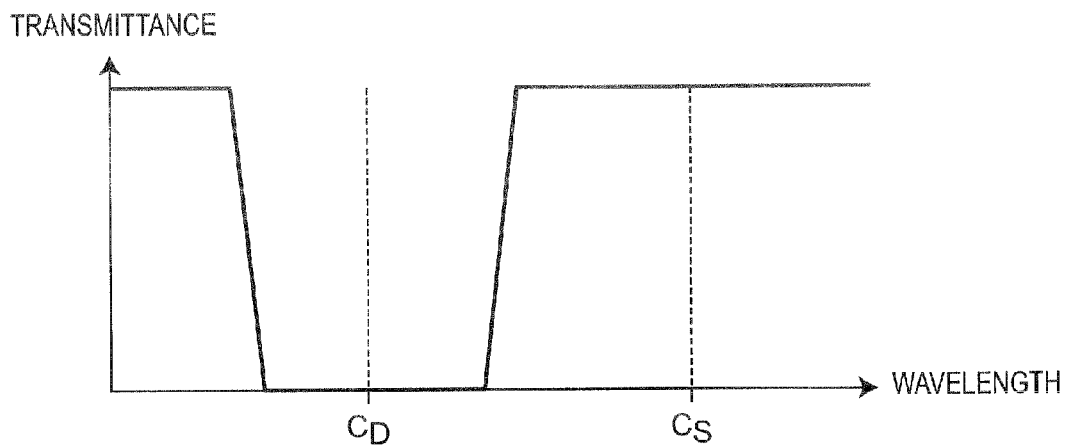

FIGS. 15A, 15B, and 15C show the characteristic of the excitation light 401 and the light signal 405, and the characteristic of the light reflectance and the light transmittance of the optical filter 301b.

As shown in FIG. 15A, in the present embodiment, the excitation light 401 has the peak of the light intensity at the wavelength $C_D$, and the light signal 405 has the peak of the light intensity at the wavelength $C_S$. The wavelength $C_D$ and the wavelength $C_S$ are only required to be different from each other, and there is no requirement on the relationship as to the magnitude between them.

As shown in FIG. 15B, the light reflectance of the optical filter 301b is high around the wavelength $C_D$ and relatively low around the wavelength $C_S$. This means that the optical filter 301b has the characteristic of excellently reflecting the excitation light 401 and reflecting the light signal 405 very little. FIG. 15C shows the light transmittance of the optical filter 301c. This shows that, conversely, the optical filter 301b transmits the excitation light 401 very little and excellently transmits the light signal 405.

7-2. Operation

In detecting connection, the sending unit 101 of the transmitting apparatus 1b emits excitation light 401.

When the transmitting apparatus 1b and the receiving apparatus 3e are not connected to each other via the optical transmission path 2b, the excitation light 401 is emitted from one end of the optical fiber 201.

When the transmitting apparatus 1b and the receiving apparatus 3e are connected to each other via the optical transmission path 2b, the excitation light 401 output from the optical fiber 201 enters the responding unit 301b (the optical filter) of the receiving apparatus 3e. The optical filter 301b reflects the excitation light. The reflection light propagates through the optical fiber 201 toward the transmitting apparatus 1b as the detection light 403, and enters the response receiving unit 103 of the transmitting apparatus 1b.

The operation after the response receiving unit 103 receives the detection light 403 and until the signal transmitting unit 109 receives the light signal is identical to the operation in the foregoing embodiments.

Most of the light signal 405 emitted from the signal transmitting unit 109 transmits through the optical filter 301b and enters the signal receiving unit 303.

Thus, with the optical transmission system 100e according to the sixth embodiment, the excitation light 401 that the sending unit 101 emits is received by the responding unit 301b. The responding unit 301b uses solely the light energy of the received excitation light to generate the detection light 403, and causes the detection light 403 to re-enter the optical transmission path 2b. The detection light 403 is received by the response receiving unit 103, and converted into the detection light current corresponding to the intensity of the received light. The detecting unit 105 detects connection of the receiving apparatus 3e based on the magnitude of the detection light current.

In this manner, the optical transmission system 100e according to the present embodiment can carry out connection detection without causing the electric energy to propagate through the connection cable (the optical transmission path 2b). Further, since the responding unit 301b arranged at the receiving apparatus 3e generates the detection light 403 by reflecting the received light, the power consumed by the responding unit 301b is substantially zero. Further, in the present embodiment, the optical filter 301b has such an optical characteristic that it can separate the excitation light 401 (the detection light 403) and the light signal 405 from each other. Thus, both the excitation light 401 (the detection light 403) and the light signal 405 can be transmitted via one single optical fiber 201. Thus, in the present embodiment, since the excitation light 401 (the detection light 403) and the light signal 405 can both be transmitted via one single optical fiber 201, the hot plug function and the signal transmission can be realized with the optical fibers fewer in the number than those in the first embodiment.

Seventh Embodiment 8-1. Structure

Next, with reference to FIGS. 16A, 16B, and 16C, a description will be given of an optical transmission system 100f according to a seventh embodiment. It is to be noted that, the description of the structure and operations which are similar to those in the other embodiments are omitted as appropriate.

The optical transmission system 100f according to the present embodiment is provided with a characteristic structure at an optical transmission path 2c. The optical transmission path 2c according to the present embodiment includes, at least at one end thereof, a lid portion 211 that can open and close. The lid portion 211 has a function of blocking the light signal 405 having propagated through the optical transmission path 2c so as not be emitted to the outside of the optical transmission path 2c from the other end, when the lid portion 211 is at the closed position. Further, the lid portion 211 does not block the light signal 405 when the lid portion 211 is at the open position. By the end portion of the optical transmission path 2c where the lid portion 211 is provided being connected to an apparatus such as a receiving apparatus 3f, the lid portion 211 shifts from the closed position to the open position by the interaction between the engaging apparatus. The mechanical structure for realizing this operation may be realized based on the conventional technique. Further, the shifting of the lid portion 211 from the closed position to the open position can manually be performed by the user. It is to be noted that the lid portion 211 can be structured to be removable from the optical transmission path 2c. Further, the closed position and the open position may be realized by anything other than the mechanical operation.

Inside the lid portion 211 (on the side facing the optical fiber 201 in the closed position), a responding unit 212 is provided. Upon reception of the excitation light 401, the responding unit 212 can emit the detection light 403a (or 403) using the light energy of the excitation light 401. Here, the optical characteristic of the responding unit 212 can be identical to that of the responding unit 301, 301a or 301b in the other embodiments.

Though the responding unit is arranged on the receiving apparatus side in the other embodiments, in the present embodiment, the responding unit 212 is arranged at the lid portion 211, i.e., at least one end portion of the optical transmission path 2c. Therefore, the receiving apparatus according to the present embodiment does not particularly require provision of the responding unit.

8-2. Operation

Figure 16A:
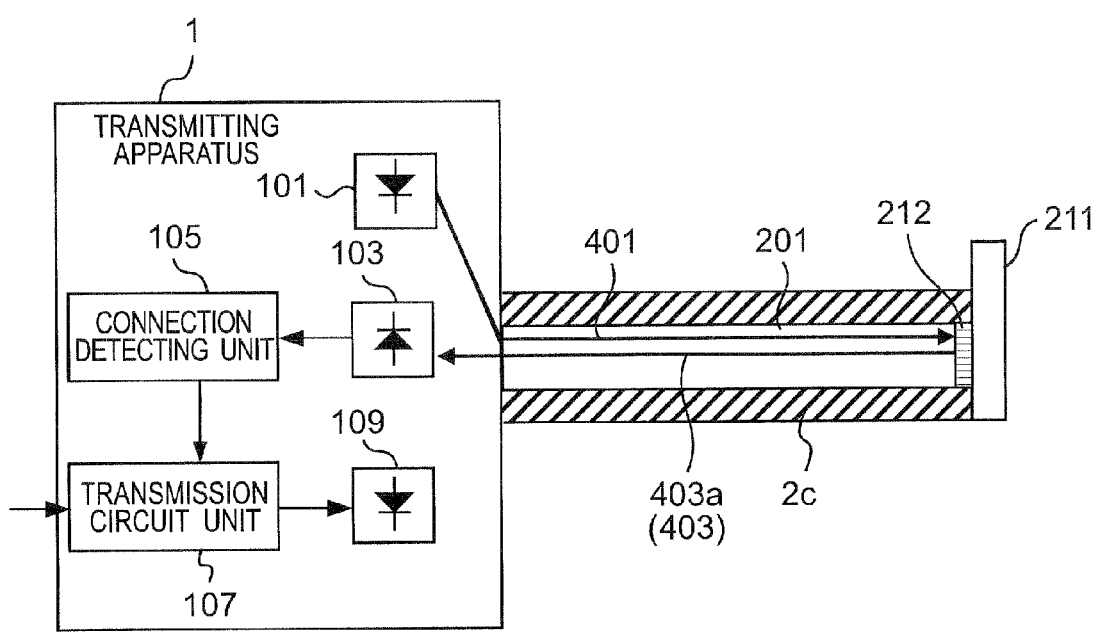
FIG. 16A is a schematic diagram showing a situation in which, in an optical transmission system according to a seventh embodiment, a transmitting apparatus and an optical transmission path are connected with each other, and the optical transmission path and a receiving apparatus are not connected with each other.

FIG. 16A shows the situation where one end of the transmitting apparatus 1 and one end of the optical transmission path 2c are connected to each other, and the other end of the optical transmission path 2c is not connected to an apparatus. In this situation, the lid portion 211 of the optical transmission path 2c is in the closed position. Accordingly, provided that the signal transmitting unit 109 emits light signal, the light signal is blocked by the lid portion 211. Therefore, the light signal will not leak outside.

In the situation shown in FIG. 16A, when the sending unit 101 of the transmitting apparatus 1 emits excitation light 401, the excitation light 401 enters one end of the optical transmission path 2c; propagates through the optical fiber 201; and enters the responding unit 212 at the other end of the optical transmission path 2c. As described above, when the responding unit 212 receives the excitation light 401, the responding unit 212 emits detection light 403. The detection light 403 emitted from the responding unit 212 propagates through the optical fiber 201, and is received by the response receiving unit 103 of the transmitting apparatus 1.

Being different from the other embodiments, the detecting unit 105 of the transmitting apparatus 1 according to the present embodiment determines that, when the detection light current whose intensity is equal to or higher than a prescribed level is received from the response receiving unit 103 while the sending unit 101 is emitting the excitation light 401, the apparatus is not connected to the other end of the optical transmission path 2c. In this state, the detecting unit 105 does not emit a connection detection signal indicative of connection to the transmission circuit unit 107.

FIG. 16B shows a situation where the transmitting apparatus 1 and the receiving apparatus 3f are connected to each other via the optical transmission path 2c. As described above, by the end portion where the lid portion 211 is arranged being connected to an apparatus, the lid portion 211 automatically shifts to the open position by the mechanical interaction with the apparatus. This automatic opening and closing mechanism of the lid portion 211 is realized by the interaction between the mechanical mechanism provided to the lid portion 211 and the mechanism of the connection portion of the apparatus.

In the situation shown in FIG. 16B, when the sending unit 101 of the transmitting apparatus 1 emits the excitation light 401, the excitation light 401 enters one end of the optical transmission path 2c; propagates through the optical fiber 201; and enters the receiving apparatus 3f from the other end of the optical transmission path 2c.

When the response receiving unit 103 does not receive a detection light current equal to or higher than a prescribed intensity despite the sending unit 101 emitting the excitation light 401, the detecting unit 105 of the transmitting apparatus 1 detects that the apparatus is connected to the other end of the optical transmission path 2c. Here, the detecting unit 105 outputs a connection detection signal indicative of connection to the transmission circuit unit 107.

It is to be noted that, at this time, the excitation light 401 enters the signal receiving unit 303 of the receiving apparatus 3f. Thus, on the receiving apparatus 3f side also, connection to the transmitting apparatus 1 via the optical transmission path 2c can be detected. Specifically, when the signal receiving unit 303 receives the excitation light 401, the signal receiving unit 303 outputs an electric signal corresponding to the light energy of the excitation light 401 to the reception circuit unit 305. Then, the reception circuit unit 305 senses connection to the transmitting apparatus 1 based on the electric signal. Thus, the present embodiment makes it possible to easily realize the hot plug function even at the receiving apparatus 3f.

As shown in FIG. 16C, the transmission circuit unit 107 having received a connection detection signal generates a drive current based on an externally received transmission signal, and outputs a drive current to the signal transmitting unit 109. Then, the light emitting element for signal transmission 109 receives the drive current, to output the light signal 405. Thus, optical transmission of information is started.

Thus, the transmission system 100f according to the present embodiment is provided with the lid portion 211 at the optical transmission path 2c, and is provided with the responding unit 211 at the lid portion 211 that receives the excitation light 401 to output the detection light 403. With such a characteristic structure, in a state where the optical transmission path 2c is not connected to the receiving apparatus 3f, even when an event where the transmitting apparatus 1 erroneously operate to output light signal 405 occurs, the lid portion 211 blocks the light signal 405 such that it is not emitted to the outside. Accordingly, the user's health will not be impaired. Further, since the responding unit 212 is arranged at the optical transmission path 2c, the receiving apparatus 3f becomes unnecessary to include any structure corresponding to the responding unit.

It is to be noted that, in the state where the receiving apparatus 3f is disconnected, the light signal 405 output from the transmitting apparatus 1 will not be output from the other end of the optical transmission path 2c by the operation of the lid portion 211. Therefore, the sending unit 101 can be omitted and the light emitting element for signal transmission 109 may be allowed to emit the excitation light 401. In this case, the excitation light 401 and the light signal 405 may be identical to each other or different from each other in wavelength. Further, in this case, the excitation light 401 and the light signal 405 may be identical to each other or different from each other in intensity.

It is to be noted that, in the present embodiment, though the lid portion 211 is provided only at one end of the optical transmission path 2c, the lid portion 211 may be arranged on each of the opposite end portions of the optical transmission path 2c. Similarly to the receiving apparatus 3f, the transmitting apparatus 1 has a mechanism for shifting the lid portion 211 from the closed state to the open state when the optical transmission path 2c is connected.

9. Eighth Embodiment 9-1. Structure

A transmission system according to the present embodiment is characterized in control of executing a connection detecting process by the transmitting apparatus. Except for this characteristic, the transmission system according to an eighth embodiment may be structured similarly to the transmission system according to the other embodiments. It is to be noted that, the transmitting apparatus (1, 1a, 1b, 1c or the like) according to the present embodiment includes a manipulation unit (not-shown) and a manipulation detecting unit (not-shown). The manipulation unit is a user interface to which the user can input instructions or the like to the transmitting apparatus, and the manipulation detecting unit is a circuit that detects manipulation performed to the manipulation unit.

In the transmitting apparatus according to the present embodiment, the manipulation detecting unit senses that the user has input instructions or the like via the manipulation unit, and based on that the connection detecting process is started and whether or not the receiving apparatus is connected is determined. Thus, the transmitting apparatus according to the present embodiment executes the connection detecting process of the receiving apparatus when the user manipulates any manipulation button. This reduces the execution frequency of the connection detecting process, whereby lifetime of the apparatus is extended and probability of occurrence of failure is reduced.

It is to be noted that, the manipulation unit of the transmitting apparatus may be a manipulation button provided to the transmitting apparatus, a manipulation button provided to the remote controller of the transmitting apparatus or the like. It is to be noted that, in the case where the transmitting apparatus can receive any manipulation content performed by the user to the remote controller of the other apparatus from another apparatus via a prescribed communication path, the remote controller itself can also be included in the manipulation unit of the transmitting apparatus.

9-2. Operation

Figure 17:
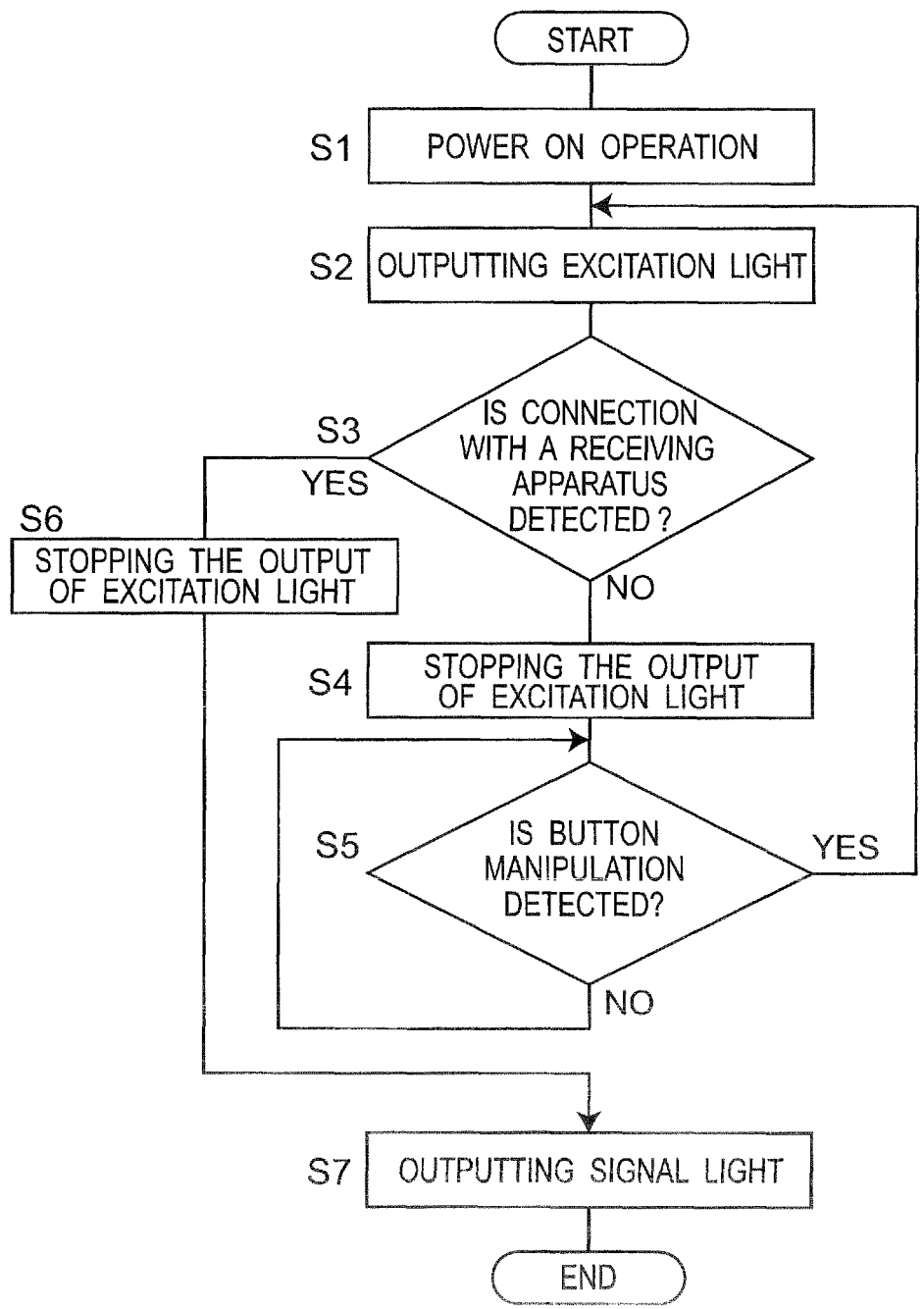
FIG. 17 is a flowchart of a connection detection process according to an eighth embodiment.

FIG. 17 is a flowchart of a process for determining start of the receiving apparatus connection detecting process executed by the transmitting apparatus according to the present embodiment.

When the power supply of the transmitting apparatus is turned ON, the transmitting apparatus executes a prescribed power ON operation (S1).

The transmitting apparatus having completed the power ON operation executes the connection detecting process of the receiving apparatus (S2, S3), similarly to the first embodiment and the like.

First, the transmitting apparatus starts outputting the excitation light (S2).

Next, based on the presence/absence of the detection light or the like, the transmitting apparatus determines connection/disconnection of the receiving apparatus. When connection of the receiving apparatus is detected ("YES" in Step S3), the transmitting apparatus stops outputting the excitation light (S6) and starts outputting the light signal to start data transmission (S7). When connection of the receiving apparatus is not detected ("NO" in Step S3), the transmitting apparatus stops outputting the excitation light (S4), and does not execute the receiving apparatus connection detecting process until any button manipulation of the manipulation unit is detected (S5).

When the transmitting apparatus detects the button manipulation of the manipulation unit ("YES" in Step S5), the transmitting apparatus again executes the receiving apparatus connection detecting process (i.e., the process returns from Step S5 to Step S2).

Until the connection of the receiving apparatus is detected, the transmitting apparatus repeatedly executes the loop of Steps S2 to S5. Thus, the transmitting apparatus starts the receiving apparatus connection detecting process immediately when the user manipulation is sensed; and when connection is detected, the transmitting apparatus can start communication with the receiving apparatus. Accordingly, the transmitting apparatus does not cause inconvenience to the user. Further, according to the present embodiment, as compared to a structure which executes the connection detecting process every certain period, the execution frequency of the connection detecting process can be reduced. This makes it possible to reduce the burden on the apparatus by the process; to extend the apparatus lifetime; and to reduce the probability of occurrence of failure.

It is to be noted that the process for connection detection of the receiving apparatus described in Steps S2 to S6 and the like may be executed by any of the structure or procedure of the first to seventh embodiments.

10. Ninth Embodiment

10-1. Structure

Finally, with reference to FIGS. 18A, 18B, and FIG. 19, a description will be given of an optical transmission system 100g according to a ninth embodiment.

The transmission system 100g according to the present embodiment is characterized in the structure of the transmitting apparatus and in control of the timing of executing the connection detecting process executed by the transmitting apparatus. Specifically, the transmitting apparatus is capable of determining presence/absence of an optical transmission path connected thereto, and the transmitting apparatus does not execute the receiving apparatus connection detecting process when there is no optical transmission path connected thereto. Except for this characteristic, the transmission system according to the ninth embodiment may similarly be structured as the transmission system according to the other embodiments. It is to be noted that, a transmitting apparatus 1d according to the present embodiment may include a manipulation unit similarly to the transmitting apparatus according to the eighth embodiment. When the transmitting apparatus includes the manipulation unit, in the present embodiment also, the control of timing of start of the connection detecting process similarly to that in the eighth embodiment can be exerted.

Figure 18A:
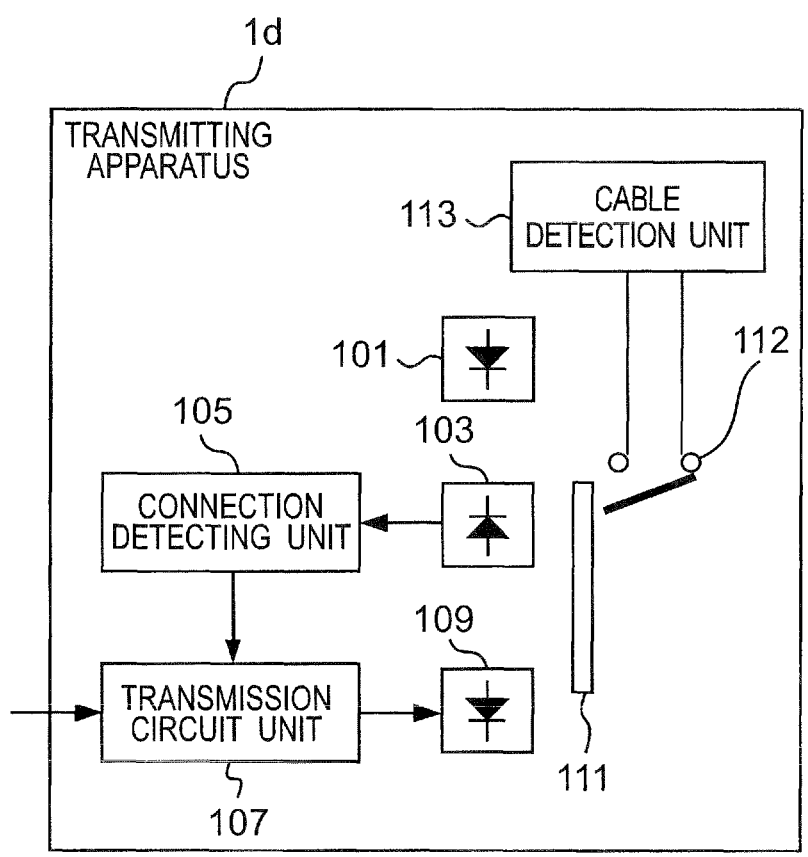
FIG. 18A is a schematic diagram showing a situation, in which, in an optical transmission system according to a ninth embodiment, a transmitting apparatus is not connected with an optical transmission path.

With reference to FIG. 18A, the structure of the transmitting apparatus 1d according to the present embodiment is shown. The transmitting apparatus 1d may include, as the optical transmission path connection detection mechanism, a mechanical switch 112 and a cable detection unit 113. As to the other structure, the transmitting apparatus 1d may similarly be structured as the transmitting apparatuses (1, 1a, 1b, and 1c) according to the other embodiments.

The optical transmission path connection detection mechanism is structured with the switch 112 whose ON/OFF changes depending on connection/disconnection of the optical transmission path, and the cable detection unit 113 that detects connection/disconnection of the optical transmission path based on ON/OFF (or OFF/ON) of the switch 112.

10-2. Operation

FIG. 18B shows the optical transmission system 100g in the state where the transmitting apparatus 1 and one end of the optical transmission path 2b are connected to each other, and the optical transmission path 2b has its other end connected to the receiving apparatus 3e. Thus, the transmitting apparatus 1d detects connection of the optical transmission path 2b by the cable detection unit 113 sensing a change in the state of the switch 112 caused by connection of the optical transmission path 2b.

It is to be noted that, the structure of the optical transmission path connection detection mechanism shown in FIGS. 18A and 18B is merely an example. The mechanism is only required to be capable of determining connection/disconnection of the optical transmission path, and is not limited to this example.

Figure 19:
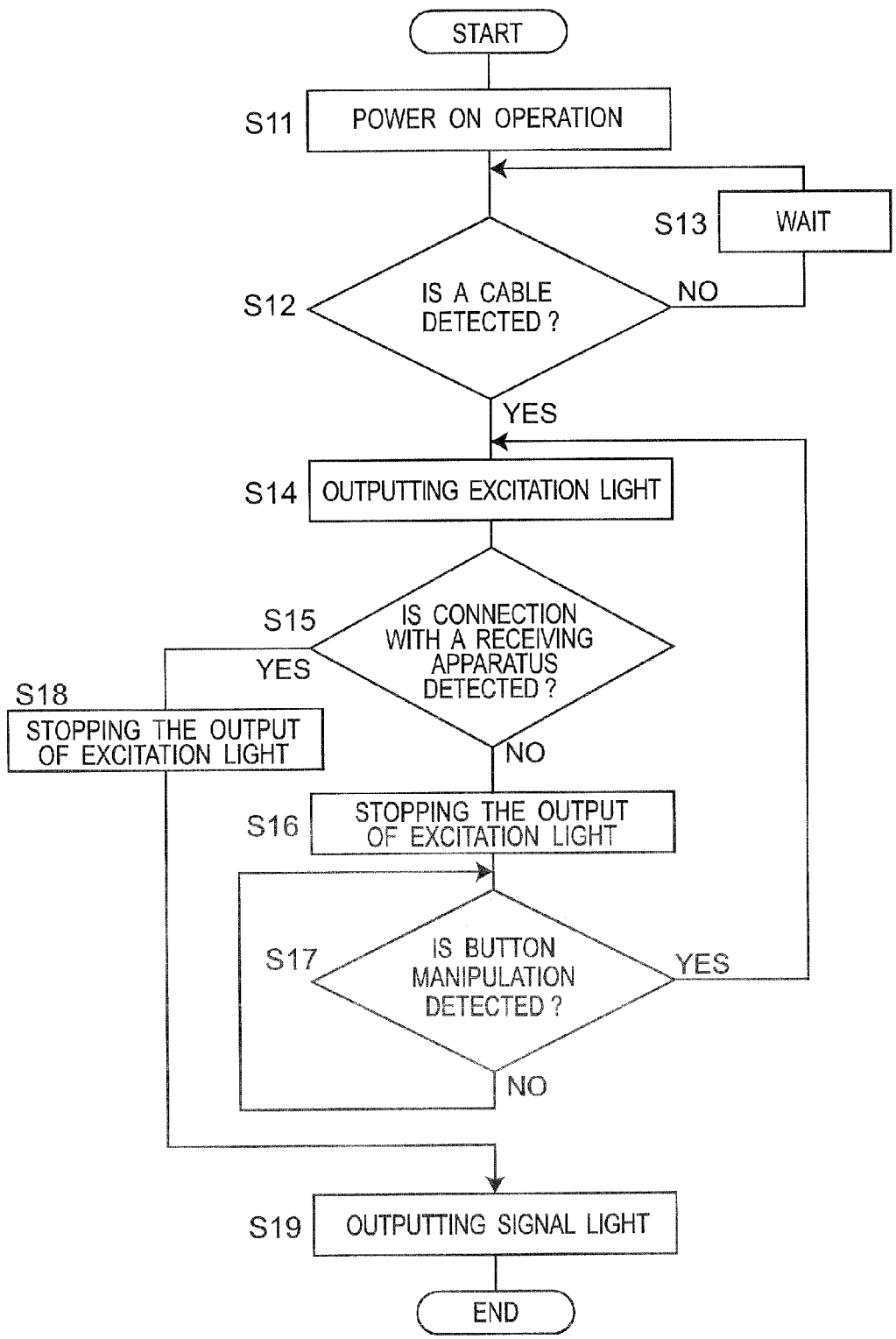
FIG. 19 is a flowchart of a connection detection process according to the ninth embodiment.
Figure 20:
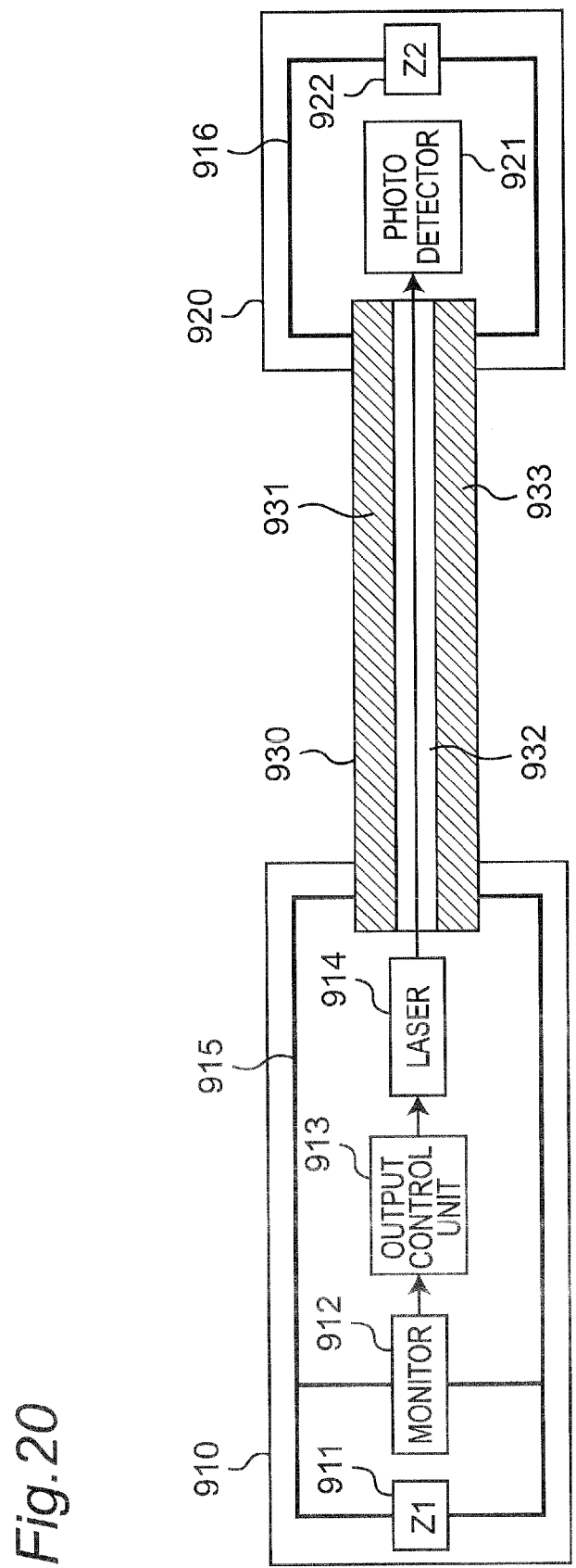
FIG. 20 is a schematic diagram of an optical transmission system according to a conventional example (connected)
Figure 21:
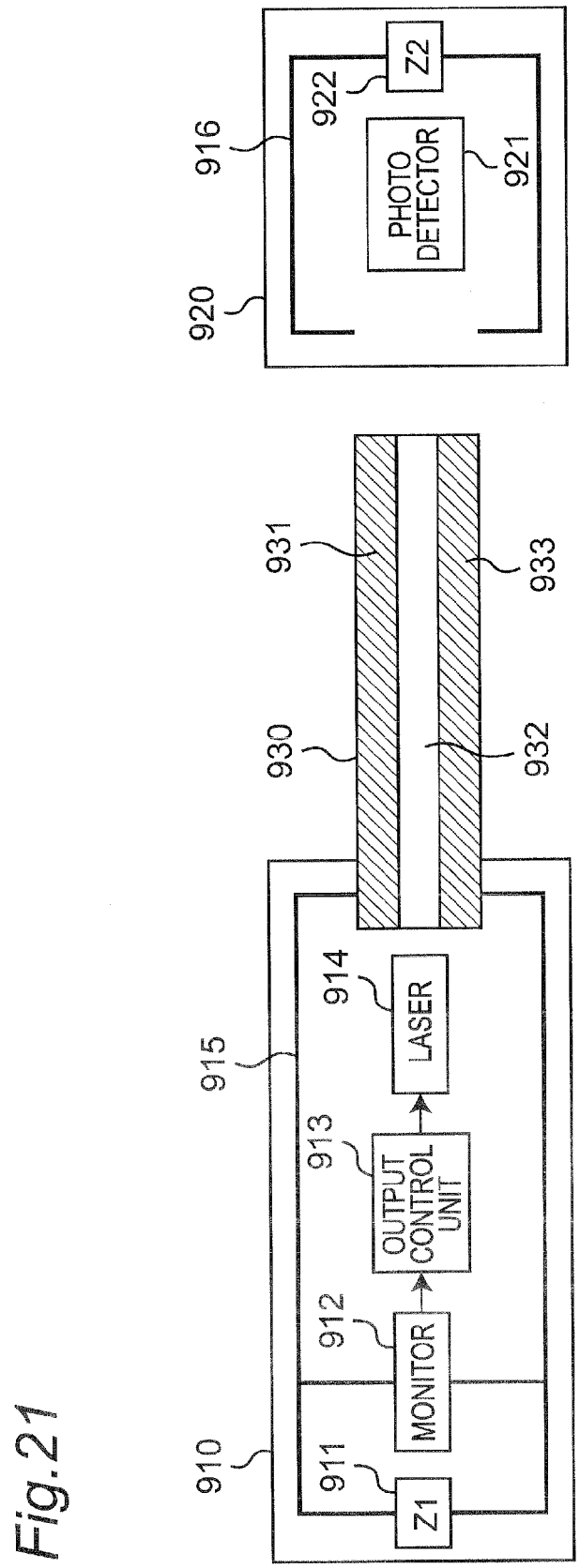
FIG. 21 is a schematic diagram of the optical transmission system according to the conventional example (not connected).

FIG. 19 is a flowchart of a process of determining start of the receiving apparatus connection detecting process executed by the transmitting apparatus 1d according to the present embodiment.

As described above, the transmitting apparatus according to the eighth embodiment executes the receiving apparatus connection detecting process when the power supply turns ON. In contrast thereto, the transmitting apparatus 1d according to the present embodiment does not start the receiving apparatus connection detecting process substantially simultaneously with the power supply being turned ON. The transmitting apparatus 1d executes the power ON operation (S11), and subsequently, determines as to presence/absence of any connected cable (the optical transmission path 2b) (S12).

When the transmitting apparatus 1d determines that there is no connected cable (the optical transmission path 2b) ("NO" in Step S12), the transmitting apparatus 1d stands by (waits) (S13).

When the transmitting apparatus 1d recognizes presence of the connected cable (the optical transmission path 2b) ("YES" in Step S12), the transmitting apparatus 1d executes the receiving apparatus connection detecting process for the first time (S14, S15).

From that point onward, the processes at Steps S14, S15, S16, S17, S18, and S19 are similar to the Steps S2, S3, S4, S5, S6, and S7 (FIG. 17) which are described in connection with the eighth embodiment. The description thereof is not repeated herein.

Thus, the transmitting apparatus 1d according to the present embodiment can detect presence/absence of the connected optical transmission path 2b. When the optical transmission path 2b is not connected, the optical transmission path 2b does not execute the process for detecting connection of the receiving apparatus. In this manner, the transmitting apparatus 1d can save the electric power consumed by the connection detection of the receiving apparatus. Further, similarly to the eighth embodiment, the transmitting apparatus 1d can extend the lifetime of the apparatus and reduce the probability of occurrence of failure.

It is to be noted that, the process for detecting the connection of the receiving apparatus described in Steps S14 to S18 and the like can be executed according to any of the structure or procedure of the first to seventh embodiments.

11. Conclusion

Thus, in the first to sixth, eighth and ninth embodiments, when the transmitting apparatus and the receiving apparatus are connected to each other via the optical transmission path, excitation light enters the responding unit via the optical transmission path. Conversely, in the seventh to ninth embodiments, in the case where the transmitting apparatus and the receiving apparatus are not connected to each other via the optical transmission path, the excitation light enters the responding unit via the optical transmission path. (In the eighth and ninth embodiments, the structure of the responding unit and the like may be any of the structure of the first to seventh embodiments). The responding unit uses the light energy of the excitation light and emits detection light to the optical transmission path. The detection light enters the response receiving unit. Upon reception of the detection light, the response receiving unit outputs a detection light current. The detecting unit detects that the transmitting apparatus and the receiving apparatus are connected to each other based on the connection detection signal. For example, the connection detecting unit can detect connection/disconnection (disconnection/connection in the seventh embodiment) based on whether the level of the detection light current is equal to or greater than a prescribed threshold value or less than the prescribed threshold value.

In the optical transmission system according to each embodiment, the connection detection function is realized by the structure using no conducting wire. Accordingly, the effect of suppressing the electromagnetic noise which is one of the advantages of the optical transmission system will not be impaired by the operation of the connection detection function. Since the connection detection function is realized by the structure of the sending unit, the responding unit, the response receiving unit, and the detecting unit, the structure is extremely compact and is advantageous also in terms of costs. Accordingly, the responding unit that can be used in the present embodiment can operate without consuming the electric power. Accordingly, the electric power consumed by the operation of the connection detection function can be suppressed to be small.

According to the third and sixth embodiments, by the operation of the optical filter separating the light for each wavelength, the hot plug function and transmission of data signals can be carried out by one single optical fiber cable.

According to the seventh embodiment, provision of the lid portion capable of opening and closing and blocking the light signal at least at one end of the optical transmission path can improve the safety of the eyes of the user. It is to be noted that, in the seventh embodiment also, the hot plug function and transmission of data signals can be carried out with one single optical fiber cable.

According to the eighth and ninth embodiments, the execution timing or frequency of the process for detecting connection of the receiving apparatus performed by the transmitting apparatus is optimized. Therefore, the effect of a further reduction in power consumption, the effect of extending the lifetime of the apparatus, and the effect of reducing the probability of occurrence of failure can be obtained.

INDUSTRIAL APPLICABILITY

The present embodiment is an optical transmission system that can detect connection between a transmitting apparatus and a receiving apparatus. The present embodiment is useful in the field of optical transmission.

REFERENCE SIGNS LIST

1 ... TRANSMITTING APPARATUS
1a ... TRANSMITTING APPARATUS
1b ... TRANSMITTING APPARATUS
1c ... TRANSMITTING APPARATUS
2 ... OPTICAL TRANSMISSION PATH
2b ... OPTICAL TRANSMISSION PATH
2c ... OPTICAL TRANSMISSION PATH
3 ... RECEIVING APPARATUS
3a ... RECEIVING APPARATUS
3a1 ... FIRST TYPE RECEIVING APPARATUS
3a2 ... SECOND TYPE RECEIVING APPARATUS
3b ... RECEIVING APPARATUS
3c ... RECEIVING APPARATUS
3d ... RECEIVING APPARATUS
3e ... RECEIVING APPARATUS
3f ... RECEIVING APPARATUS
100 ... OPTICAL TRANSMISSION SYSTEM
100a ... OPTICAL TRANSMISSION SYSTEM
100b ... OPTICAL TRANSMISSION SYSTEM
100c ... OPTICAL TRANSMISSION SYSTEM
100d ... OPTICAL TRANSMISSION SYSTEM
100e ... OPTICAL TRANSMISSION SYSTEM
100f ... OPTICAL TRANSMISSION SYSTEM
100g ... OPTICAL TRANSMISSION SYSTEM
101 ... SENDING UNIT
102 ... FIRST OPTICAL FILTER FOR THE RESPONSE RECEIVING UNIT
102a ... OPTICAL FILTER FOR SENDING UNIT
102b ... OPTICAL FILTER FOR THE SIGNAL TRANSMITTING UNIT
102c ... SECOND OPTICAL FILTER FOR THE RESPONSE RECEIVING UNIT
103 ... RESPONSE RECEIVING UNIT
103a ... FIRST RESPONSE RECEIVING UNIT
103b ... SECOND RESPONSE RECEIVING UNIT
105 ... DETECTING UNIT
105a ... DETECTING UNIT
107 ... TRANSMISSION CIRCUIT UNIT
107a ... TRANSMISSION CIRCUIT UNIT
109 ... SIGNAL TRANSMITTING UNIT
111 ... OPTICAL WAVELENGTH MULTIPLEXING AND DEMULTIPLEXING FILTER
111a ... OPTICAL WAVELENGTH MULTIPLEXING AND DEMULTIPLEXING FILTER
112 ... MECHANICAL SWITCH
113 ... CABLE DETECTION UNIT
200 ... OPTICAL TRANSMISSION SYSTEM
201 ... FIRST OPTICAL FIBER
203 ... SECOND OPTICAL FIBER
211 ... LID PORTION
212 ... RESPONDING UNIT
301 ... LIGHT DEFLECTING ELEMENT (REFLECTOR)
301a ... WAVELENGTH CONVERSION ELEMENT (PHOSPHOR)
301a1 ... FIRST WAVELENGTH CONVERTER ELEMENT
301a2 ... SECOND WAVELENGTH CONVERTER ELEMENT
301B ... OPTICAL FILTER (FIBER GRATING FILTER)
303 ... SIGNAL RECEIVING UNIT
305 ... RECEPTION CIRCUIT. UNIT
307 ... OPTICAL WAVELENGTH MULTIPLEXING AND DEMULTIPLEXING FILTER
309a ... OPTICAL FILTER FOR THE RESPONDING UNIT
309b ... OPTICAL FILTER FOR SIGNAL RECEIVING UNIT
311 ... SOLAR BATTERY
313 ... POWER SUPPLY CONTROL UNIT
401 ... EXCITATION LIGHT
403 ... DETECTION LIGHT
403a ... DETECTION LIGHT
405 ... LIGHT SIGNAL

The invention claimed is:

1. An optical transmission system for optically transmitting information between apparatuses via an optical transmission path, comprising:
   a sending unit that is operable to emit, to the optical transmission path, excitation light for detecting an inter-apparatus connection via the optical transmission path;
   a responding unit that is operable to receive the excitation light from the optical transmission path and emit detection light to the optical transmission path using light energy of the excitation light;
   a response receiving unit that is operable to receive the detection light from the optical transmission path and output a detection light current;
   a detecting unit that is operable to detect a presence or an absence of the inter-apparatus connection based on the detection light current, and generate a detection result;
   an optical transmission light signal transmitting unit that is operable to emit, to the optical transmission path, a light signal for optically transmitting the information based on the detection result by the detecting unit; and
   an optical transmission light signal receiving unit that is operable to receive the light signal from the optical transmission path,
   wherein
   the responding unit includes a wavelength conversion element that absorbs at least part of the excitation light and emits the detection light having a peak wavelength being different from a peak wavelength of the excitation light, and
   the response receiving unit includes a filter that blocks the excitation light and allows the detection light, which has the peak wavelength different from the peak wavelength of the excitation light, to pass.

2. The optical transmission system according to claim 1, further comprising an optical transmission path connection detecting unit, at least at one of the apparatuses, that is operable to detect a connection of the optical transmission path, wherein
   the sending unit emits the excitation light in a case where the optical transmission path connection detecting unit detects the connection of the optical transmission path.

3. The optical transmission system according to claim 1, further comprising a manipulation detecting unit, at least at one of the apparatuses, that is operable to detect a user manipulation, wherein
   the sending unit outputs the excitation light when the manipulation detecting unit detects the user manipulation.

4. The optical transmission system according to claim 1, wherein the wavelength conversion element is a phosphor.

5. The optical transmission system according to claim 1, wherein the responding unit is an optical filter.

6. The optical transmission system according to claim 5, wherein the optical filter is a fiber grating filter.

7. The optical transmission system according to claim 1, wherein the detecting unit determines a type of apparatus connected via the optical transmission path based on a wavelength of the detection light received by the response receiving unit.

8. The optical transmission system according to claim 1, further comprising:
   a solar battery that absorbs at least part of the excitation light to generate an electromotive force; and
   a power supply control unit that controls power supply to the optical transmission light signal receiving unit based on an output from the solar battery.

9. The optical transmission system according to claim 1, further comprising a power supply control unit that controls power supply to the optical transmission light signal receiving unit based on the light signal received by the optical transmission light signal receiving unit.

10. The optical transmission system according to claim 1, wherein the sending unit is a light emitting diode.

11. The optical transmission system according to claim 1, wherein the optical transmission light signal transmitting unit is a semiconductor laser.

12. The optical transmission system according to claim 1, wherein:
   the optical transmission path is provided with a lid portion at least at one end portion of the optical transmission path;
   the lid portion includes the responding unit;
   the lid portion shifts from a closed position to an open position by the one end portion being connected to at least one of the apparatuses; and
   in the closed position, the lid portion blocks the light signal that has propagated through the optical transmission path.

* * * * *